United States Patent
Eim et al.

(10) Patent No.: US 10,219,026 B2
(45) Date of Patent: Feb. 26, 2019

(54) MOBILE TERMINAL AND METHOD FOR PLAYBACK OF A MULTI-VIEW VIDEO

(71) Applicant: LG ELECTRONICS INC., Seoul (KR)

(72) Inventors: Sanghyun Eim, Seoul (KR); Jihye Ham, Soul (KR)

(73) Assignee: LG ELECTRONICS INC., Seoul (KR)

( * ) Notice: Subject to any disclaimer, the term of this patent is extended or adjusted under 35 U.S.C. 154(b) by 276 days.

(21) Appl. No.: 15/196,639

(22) Filed: Jun. 29, 2016

(65) Prior Publication Data

US 2017/0064374 A1    Mar. 2, 2017

Related U.S. Application Data

(60) Provisional application No. 62/209,901, filed on Aug. 26, 2015.

(30) Foreign Application Priority Data

Nov. 9, 2015   (KR) ........................ 10-2015-0156686

(51) Int. Cl.
  *G06F 3/0481*    (2013.01)
  *G06F 3/0488*    (2013.01)
  (Continued)

(52) U.S. Cl.
  CPC ....... *H04N 21/4312* (2013.01); *G06F 3/0485* (2013.01); *G06F 3/0488* (2013.01);
  (Continued)

(58) Field of Classification Search
  CPC .......... H04N 21/4312; H04N 5/23238; H04N 5/23293; H04N 5/247; G06F 3/04845;
  (Continued)

(56) References Cited

U.S. PATENT DOCUMENTS 7,196,722 B2 *   3/2007   White .................. G11B 27/034
                                                              348/14.01
7,609,910 B2 * 10/2009   Geiger .................... G06T 15/08
                                                              348/38

(Continued)

OTHER PUBLICATIONS

Zhao et al. Cube2Video: Navigate Between Cubic Panoramas in Real-Time. IEEE Transactions on Multimedia, vol. 15, No. 8, Dec. 2013. pp. 1745-1754. (Year: 2013).*

(Continued)

*Primary Examiner* — Amy M Levy
(74) *Attorney, Agent, or Firm* — Dentons US LLP

(57) ABSTRACT

A mobile terminal for and method of changing a playback time point and a playback viewing angle in a multi-view video. The mobile terminal including a touchscreen and a controller to control the touchscreen, to display a first frame corresponding to a first viewing angle area of a first time point and a progress bar corresponding to the multi-view video, to move a time indicator displayed on a position corresponding to the first time point to a position corresponding to a second time point of the progress bar according to a first input signal inputted on the progress bar, to display a first thumbnail image corresponding to the first viewing angle area of the second time point, and to display a second thumbnail image corresponding to a second viewing angle area of the second time point according to a second input signal inputted on the second thumbnail image.

18 Claims, 26 Drawing Sheets

(51) Int. Cl.
*H04N 21/431* (2011.01)
*H04N 5/232* (2006.01)
*H04N 5/247* (2006.01)
*G06F 3/0484* (2013.01)
*G06F 3/0485* (2013.01)

(52) U.S. Cl.
CPC ...... *G06F 3/04817* (2013.01); *G06F 3/04842* (2013.01); *G06F 3/04845* (2013.01); *H04N 5/23238* (2013.01); *H04N 5/23293* (2013.01); *H04N 5/247* (2013.01)

(58) Field of Classification Search
CPC ............. G06F 3/04817; G06F 3/04842; G06F 3/0485; G06F 3/0488; G06F 3/048
See application file for complete search history.

(56) References Cited

U.S. PATENT DOCUMENTS

| | | | | |
|---|---|---|---|---|
| 7,884,855 B2* | 2/2011 | Ortiz | ...................... | H04N 5/232 348/157 |
| 7,996,771 B2* | 8/2011 | Girgensohn | ........ | G06F 17/3079 348/143 |
| 8,830,193 B2* | 9/2014 | Shah | ...................... | G06F 3/0488 345/173 |
| 9,244,940 B1* | 1/2016 | Donsbach | ................ | G06T 11/20 |
| 9,361,011 B1* | 6/2016 | Burns | ............... | G06F 17/30825 |
| 9,369,635 B1* | 6/2016 | Hilla | ...................... | H04N 5/265 |
| 9,781,356 B1* | 10/2017 | Banta | .................. | H04N 5/2628 |
| 9,838,687 B1* | 12/2017 | Banta | ............... | H04N 19/00903 |
| 9,934,823 B1* | 4/2018 | Bentley | ............. | G11B 27/3081 |
| 2002/0049979 A1* | 4/2002 | White | ................... | G11B 27/034 725/87 |
| 2004/0126085 A1* | 7/2004 | Braun | .................. | G11B 27/105 386/201 |
| 2004/0239763 A1* | 12/2004 | Notea | .................... | H04N 5/222 348/169 |
| 2006/0023066 A1* | 2/2006 | Li | ..................... | H04N 21/21805 348/159 |
| 2008/0076556 A1* | 3/2008 | Icart | ....................... | A63F 13/10 463/32 |
| 2008/0088706 A1* | 4/2008 | Girgensohn | ........... | H04N 5/247 348/207.99 |
| 2009/0164439 A1* | 6/2009 | Nevins | ............... | G06F 17/30241 |
| 2009/0220206 A1* | 9/2009 | Kisliakov | ............ | G11B 27/034 386/353 |
| 2009/0262206 A1* | 10/2009 | Park | ................ | G08B 13/19641 348/218.1 |
| 2009/0309975 A1* | 12/2009 | Gordon | .............. | H04N 5/23206 348/159 |
| 2010/0002082 A1* | 1/2010 | Buehler | ............ | G08B 13/19645 348/159 |
| 2010/0278509 A1 | 11/2010 | Nagano et al. | | |
| 2011/0040760 A1* | 2/2011 | Fleischman | ............. | G06Q 30/02 707/737 |
| 2011/0234807 A1* | 9/2011 | Jones | ............... | G08B 13/19641 348/159 |
| 2012/0206565 A1* | 8/2012 | Villmer | .................... | H04N 1/00 348/36 |
| 2012/0307068 A1* | 12/2012 | Feinson | ............... | H04N 13/243 13/243 |
| 2012/0329527 A1* | 12/2012 | Kang | ................. | H04N 13/0059 455/566 |
| 2013/0091432 A1* | 4/2013 | Shet | ................. | G08B 13/19645 715/719 |
| 2013/0129307 A1* | 5/2013 | Choe | .................... | H04N 5/2621 386/227 |
| 2013/0210563 A1* | 8/2013 | Hollinger | ............. | H04N 5/2252 473/570 |
| 2013/0325244 A1* | 12/2013 | Wang | ...................... | G05D 1/028 701/26 |
| 2013/0328997 A1* | 12/2013 | Desai | ...................... | H04N 7/141 348/14.02 |
| 2014/0232873 A1* | 8/2014 | Meganathan | ........ | G06F 3/04817 348/152 |
| 2015/0058709 A1* | 2/2015 | Zaletel | ................. | H04L 65/608 715/202 |
| 2015/0143239 A1* | 5/2015 | Birkbeck | .............. | G06F 3/0484 715/716 |
| 2015/0178953 A1* | 6/2015 | Gao | ..................... | G06F 17/2765 345/681 |
| 2015/0193127 A1* | 7/2015 | Chai | ................. | G08B 13/19645 715/719 |
| 2015/0242404 A1* | 8/2015 | Underwood, IV | ........................ G06F 3/04855 707/748 |
| 2015/0281507 A1* | 10/2015 | Konen | ................. | H04N 1/2112 348/231.6 |
| 2015/0310280 A1* | 10/2015 | Bentley | .................... | A63F 13/00 382/103 |
| 2015/0356840 A1* | 12/2015 | Wang | ................. | G08B 13/19682 382/103 |
| 2016/0071314 A1* | 3/2016 | Nordstoga | ............ | G06T 15/205 345/427 |
| 2016/0099025 A1* | 4/2016 | Anwar | ................. | G11B 27/036 386/244 |
| 2016/0119541 A1* | 4/2016 | Alvarado-Moya | ... G06T 3/4038 348/38 |
| 2016/0173775 A1* | 6/2016 | Lowry | ............... | H04N 5/23238 348/36 |
| 2017/0201694 A1* | 7/2017 | Hasegawa | ............... | H04N 5/247 |

OTHER PUBLICATIONS

European search report for Application No. 16179111.6-1879.20 dated Jan. 2017. 8 pages.

* cited by examiner

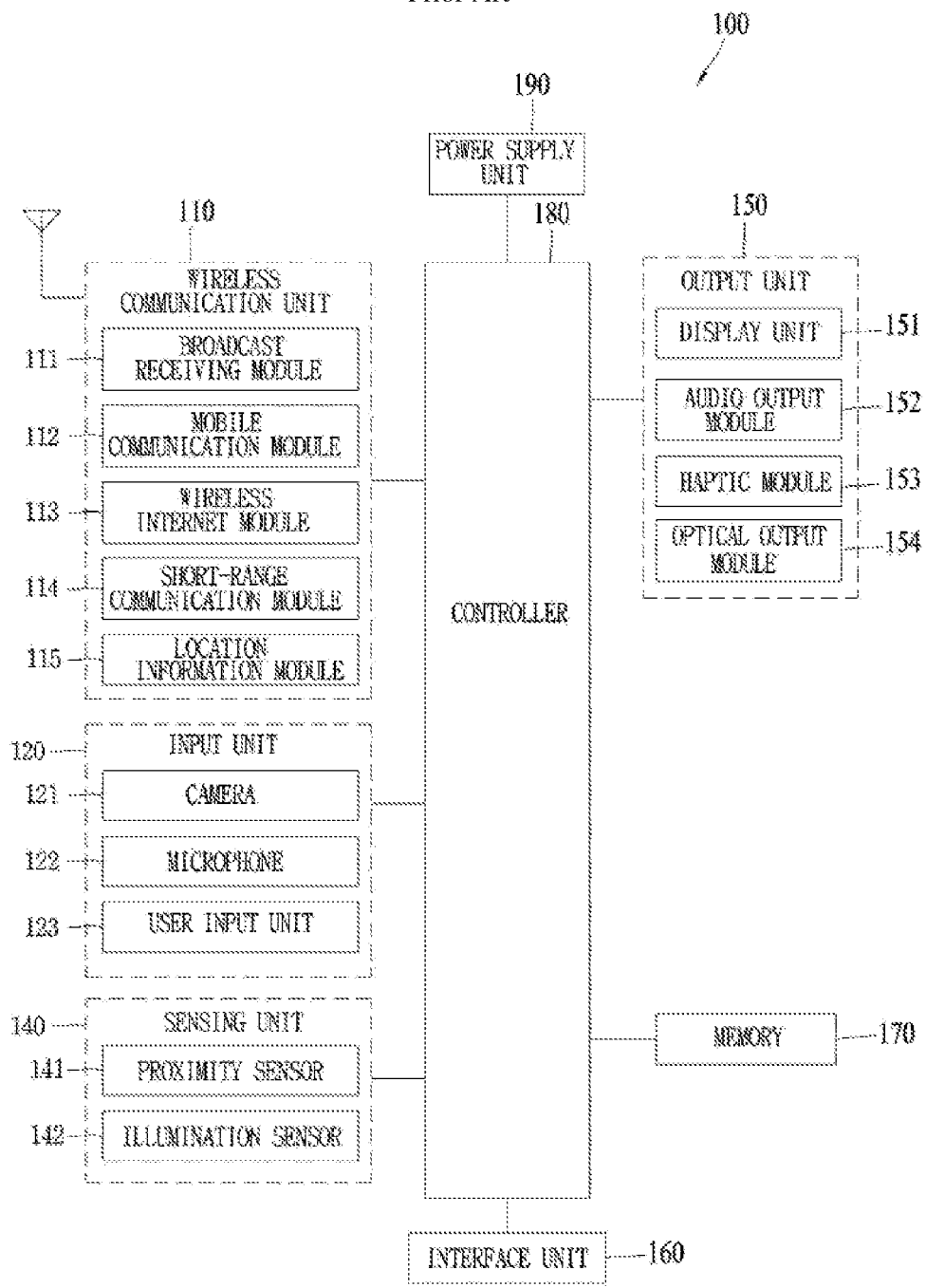

FIG. 6
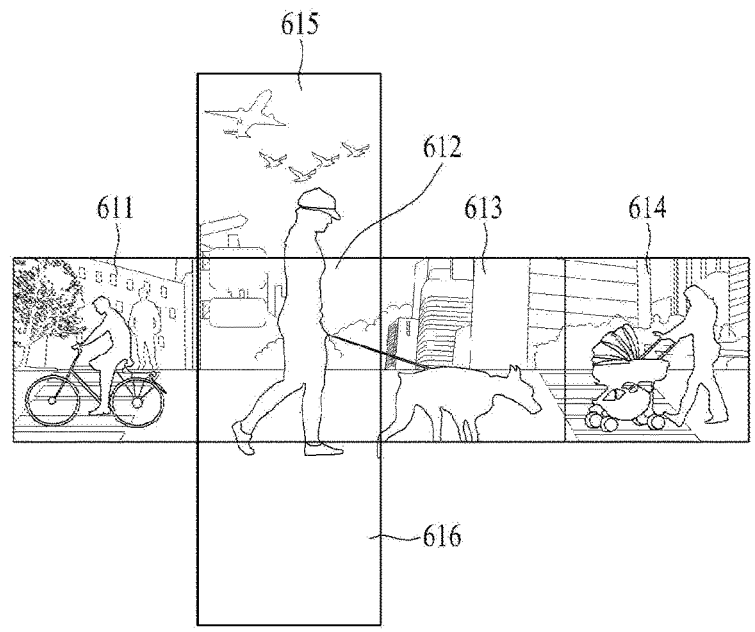
(a)
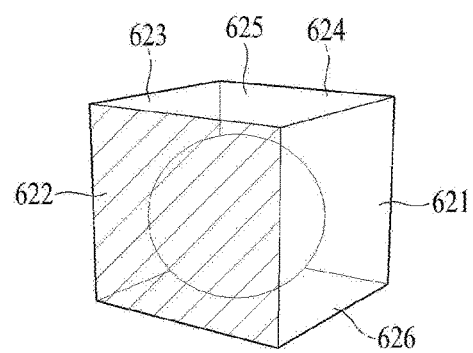
(b)
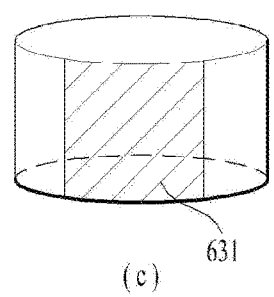
(c)

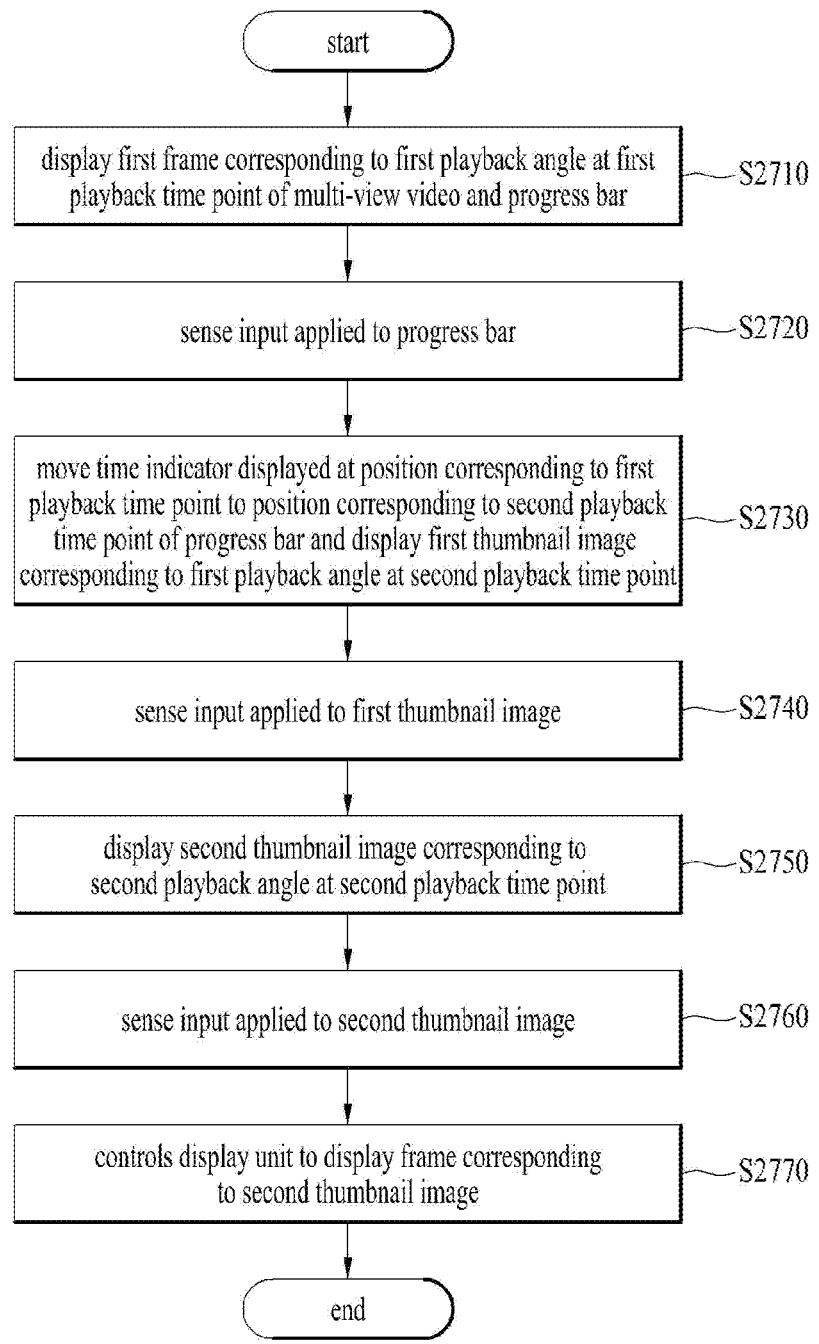

MOBILE TERMINAL AND METHOD FOR PLAYBACK OF A MULTI-VIEW VIDEO

This application claims the benefit of earlier filing date and right of priority to U.S. Provisional Application No. 62/209,901, filed on Aug. 26, 2015, and Korean Application No. 10-2015-0156686, filed on Nov. 9, 2015, the contents of which are hereby incorporated by reference herein in their entirety.

BACKGROUND OF THE INVENTION

Field of the Invention

The present invention relates to a mobile terminal and a method of controlling therefor. More particularly, the present invention relates to a mobile terminal capable of changing playback time and a playback angle in a multi-view video including a viewing angle of 360 degrees and a method of controlling therefor.

Discussion of the Related Art

A mobile terminal is a device that may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals. Mobile terminals can be further classified into handheld terminals and vehicle mount terminals.

There are ongoing efforts to support and increase the functionality of mobile terminals. Such efforts include software and hardware improvements, as well as changes and improvements in the structural components which form the mobile terminal.

When a user uses a VR (virtual reality) video including a viewing angle of 360 degrees, a method capable of easily and intuitively changing not only playback time but also a playback angle on a progress bar is required. When a user watches a video including a viewing angle of 360 degrees, if the user is able to see a video for a partial angle only among 360 degrees, the user becomes unaware of an object or a person captured in a different viewing angle.

SUMMARY OF THE INVENTION

Accordingly, the present invention is directed to an apparatus and method thereof that substantially obviate one or more problems due to limitations and disadvantages of the related art.

An aspect of the present invention is to solve the aforementioned problem and to gain additional advantages. When only a partial viewing angle area is played among a video in which 360 degrees are captured, another aspect of the present invention is to provide a mobile terminal capable of using a different playback angle of identical time by an input signal inputted on a progress bar or a frame and a method of controlling therefor.

Another aspect of the present invention is to provide a mobile terminal that when a video is played on the basis of a partial angle area in a multi-view video in which 360 degrees are captured, can provide information on the movement of an object or a person in the other viewing angle areas and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a mobile terminal includes a display unit, a sensing unit that senses and input signal, and a controller that controls the display unit and the sensing unit displays a progress bar of a multi-view and a first frame corresponding to a first viewing angle area at a first time point from the multi-view video moves a time indicator displayed from a position on the progress bar corresponding to the first time point to a position corresponding to a second time point on the progress bar in response to a first input signal sensed on the progress bar and displays a first thumbnail image corresponding to the first viewing angle area at the second time point, and displays a second thumbnail image corresponding to a second viewing angle area at the second time point according to a second input signal sensed on the second thumbnail image.

To further achieve these objects and other advantages and in accordance with the purpose of the invention, as embodied and broadly described herein, according to a different embodiment, the controller further controls the display unit to display a frame corresponding to the second thumbnail image in response to an input applied to the second thumbnail image.

To further achieve these objects and other advantages and in accordance with the purpose of the invention, as embodied and broadly described herein, according to a different embodiment, the controller further controls the display unit to display a thumbnail editing indicator on the first thumbnail image in response to a corresponding input sensed prior to the input applied to the first thumbnail image.

To further achieve these objects and other advantages and in accordance with the purpose of the invention, as embodied and broadly described herein, according to a different embodiment, the controller further controls the display unit to display a third thumbnail image corresponding to a different playback angle at a playback time point identical to the playback time point of the first thumbnail image in response to a second input applied to the first thumbnail image.

To further achieve these objects and other advantages and in accordance with the purpose of the invention, as embodied and broadly described herein, according to a different embodiment, the controller further controls the display unit to display a second frame corresponding to a third playback angle different from the first playback angle, at the first playback time point in response to an input applied to the first frame.

To further achieve these objects and other advantages and in accordance with the purpose of the invention, as embodied and broadly described herein, according to a different embodiment, the controller controls the display unit to simultaneously display the first frame and a second frame corresponding to a third playback angle different from the first playback angle at the first playback time point in response to an input applied to the first frame.

To further achieve these objects and other advantages and in accordance with the purpose of the invention, as embodied and broadly described herein, according to a different embodiment, the controller further controls the display unit to display a third frame corresponding to a playback angle different from the playback angle of the first frame, and display a fourth frame corresponding to a playback angle different from the playback angle of the second frame in response to a second input applied to the first frame.

To further achieve these objects and other advantages and in accordance with the purpose of the invention, as embodied and broadly described herein, according to a different embodiment, the controller further controls the display unit to display the first frame with a reduced display size in response to a corresponding input.

To further achieve these objects and other advantages and in accordance with the purpose of the invention, as embodied and broadly described herein, according to a different embodiment, the controller further controls the display unit to display an angle indicator indicating the first playback angle of the first frame.

To further achieve these objects and other advantages and in accordance with the purpose of the invention, as embodied and broadly described herein, according to a different embodiment, the controller further controls the display unit to display a second frame indicating a playback angle different from the playback angle of the first frame in response to an input applied to the angle indicator.

To further achieve these objects and other advantages and in accordance with the purpose of the invention, as embodied and broadly described herein, according to a different embodiment, the controller further controls the display unit to display a second frame corresponding to a playback angle of 360 degrees and an editing indicator for editing a playback angle in response to an input applied to the first frame.

To further achieve these objects and other advantages and in accordance with the purpose of the invention, as embodied and broadly described herein, according to a different embodiment, when an input applied to a playback icon is sensed while the first frame is displayed, the controller controls the display unit to sequentially scroll through and display each frame corresponding to each playback angle of a 360 degree multi-view video and play a first video corresponding to the first frame after sequentially scrolling through and displaying each frame, wherein each of the displayed frames begin at the first playback time point, wherein each of the displayed frames correspond to a predetermined tilt angle, and wherein each playback angle corresponding to each frame makes up a portion of the 360 degree multi-view video.

To further achieve these objects and other advantages and in accordance with the purpose of the invention, as embodied and broadly described herein, according to a different embodiment, when the frames are being sequentially displayed, a corresponding input applied to one of the frames is sensed, the controller controls the display unit to play a second video corresponding to a the frame on which the corresponding input is sensed after sequentially displaying each frame corresponding to each playback angle of a 360 degree multi-view video.

To further achieve these objects and other advantages and in accordance with the purpose of the invention, as embodied and broadly described herein, according to a different embodiment, the controller further controls the display unit to display a third thumbnail image corresponding to an a second frame in which an object of a multi-view video appears at a third playback time point, in response to an input applied to the object which is displayed in the first frame.

To further achieve these objects and other advantages and in accordance with the purpose of the invention, as embodied and broadly described herein, according to a different embodiment, if a movement of an object is recognized at a playback angle other than the first playback angle while the first video corresponding to the first frame is playing, the controller further controls the display unit to display a movement indicator.

To further achieve these objects and other advantages and in accordance with the purpose of the invention, as embodied and broadly described herein, according to a different embodiment, if a movement of an object is recognized at a playback angle other than the first playback angle while the first video corresponding to the first frame is playing, the controller further controls the display unit to display a movement thumbnail containing the object and play a second video indicating a playback angle corresponding to the movement thumbnail in response to an input applied to the movement thumbnail.

To further achieve these objects and other advantages and in accordance with the purpose of the invention, as embodied and broadly described herein, according to a different embodiment, when a movement of an object is recognized at a playback angle other than the first playback angle while the video is playing, the controller further controls the display unit to display a movement thumbnail containing the object and wherein if an input applied to the movement thumbnail is sensed, the controller stops the playing of the video and controls the display unit to sequentially scroll through and display each frame corresponding to each of 360 different angles of the multi-view video, wherein each of the displayed frames correspond to a playback time point at which the input is applied to the movement thumbnail, wherein each of the displayed frames correspond to a predetermined tilt angle, and wherein each playback angle corresponding to each frame makes up a portion of the 360 degree multi-view video.

To further achieve these objects and other advantages and in accordance with the purpose of the invention, as embodied and broadly described herein, according to a different embodiment, the multi-view video corresponds to a video in which 360 degrees are captured by a plurality of cameras at a predetermined tilt angle.

To further achieve these objects and other advantages and in accordance with the purpose of the invention, as embodied and broadly described herein, according to a different embodiment, a method of controlling a mobile terminal includes the steps of displaying a progress bar corresponding to a multi-view video and a first frame corresponding to a first viewing angle area at a first time point from the multi-view video, moving a time indicator from a position on the progress bar corresponding to the first time point to a position corresponding to a second time point on the progress bar in response to a first input signal sensed on the progress bar and displaying a first thumbnail image corresponding to the first viewing angle area at the second time point and displaying a second thumbnail image corresponding to a second viewing angle area the second time point in response to a second input signal sensed on the second thumbnail image.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 1A is a block diagram of a mobile terminal in accordance with the present disclosure;

FIG. 6 is a diagram for an example of an indicator of a multi-view video displayed in a mobile terminal according to one embodiment of the present invention;

FIG. 27 is a flowchart for a method of controlling a mobile terminal according to one embodiment of the present invention.

DETAILED DESCRIPTION OF THE INVENTION

Description will now be given in detail according to exemplary embodiments disclosed herein, with reference to the accompanying drawings. For the sake of brevity, the same or equivalent components may be provided with the same reference numbers and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
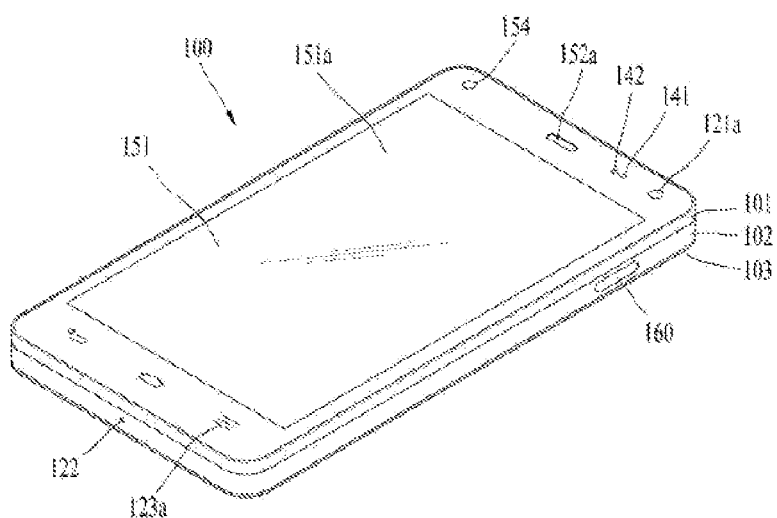
FIGS. 1B and 1C are conceptual views of one example of the mobile terminal, viewed from different directions.
Figure 1C:
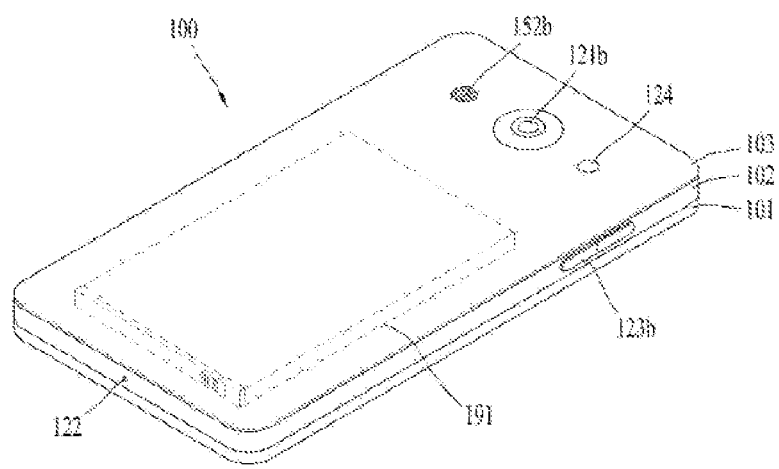

Reference is now made to FIGS. 1A-1C, where FIG. 1A is a block diagram of a mobile terminal in accordance with the present disclosure, and FIGS. 1B and 1C are conceptual views of an exemplary mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, and communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or a function appropriate for a user in a manner of processing a signal, data, information, and the like inputted or outputted via the aforementioned configuration elements or executing an application program stored in the memory 170.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least a part of the aforementioned configuration elements can operate in a manner of cooperating with each other to implement an operation of a mobile terminal, a control of the mobile terminal or a method of controlling the mobile terminal according to various embodiments described in the following. The operation of the mobile terminal, the control of the mobile terminal or the method of controlling the mobile terminal can be implemented on the mobile terminal in a manner of executing at least one or more application programs stored in the memory 170.

Referring still to FIG. 1A, various components depicted in this figure will now be described in more detail.

Regarding the wireless communication unit 110, the broadcast receiving module 111 can be configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server that can receive a pre-generated broadcast signal and/or broadcast associated information, and send such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 can be configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 can be configured to facilitate short-range communications. Suitable technologies for implementing such short-range communications include BLUETOOTH, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general can support wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various viewing angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key located on the mobile terminal at a location that is other than the touch screen. Alternatively, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type proximity sensor, the proximity sensor 141 can sense proximity of a pointer relative to the touch screen by changes in an electromagnetic field, that is responsive to an approach of a conductive object. In this case, the touch screen (touch sensor) may also be categorized as a proximity sensor.

The term "proximity touch" will often be referred to herein to denote the case where a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and causes output of visual information on the touch screen. In addition, the controller 180 can control the mobile terminal 100 to execute different operations or can process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert into electric input signals either changes of pressure applied to a specific part of the display unit 151, or capacitance occurring at a specific part of the display unit 151. The touch sensor may also be configured to sense not only a touched position and a touched area, but a touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, of the controller 180, or combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. An example of a tactile effect generated by the haptic module 153 is vibration. The strength, pattern and the like of the vibration generated by the haptic module 153 can be controlled by user selection or setting by the controller.

For example, the haptic module 153 may output different vibrations in combination or in a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to rear case 102. Examples of such electronic components include a detachable battery 191, an identification module, a memory card, and the like. Rear cover 103 is shown covering the electronic components, and this cover may be detachably coupled to rear case 102. Therefore, when the rear cover 103 is detached from the rear case 102, the electronic components mounted to the rear case 102 become exposed.

As illustrated, when the rear cover 103 is coupled to the rear case 102, a side surface of the rear case 102 can be partially exposed. In some cases, upon the coupling, the rear case 102 may also be completely shielded by the rear cover 103. In some embodiments, the rear cover 103 may include an opening for exposing a camera 121b or an audio output module 152b.

The cases 101, 102, and 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

A mobile terminal 100 can include a display unit 151, a first and second audio output unit 152a/152b, a proximity sensor 141, an illumination sensor 142, an optical output unit 154, a first and a second camera 121a/121b, a first and a second operation unit 123a/123b, a microphone 122, an interface unit 160 and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content input by touching may be a text or numerical value, or a menu item which can be indicated or designated in various modes.

The touch sensor may be configured as a film having a touch pattern, disposed between the window 151a and a display on a rear surface of the window 151a, or as a metal wire patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds cannot be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which can be manipulated by a user to provide input to the mobile terminal 100. The first and second manipulation units 123a and 123b may also be commonly referred to as a manipulating portion, and may employ any tactile method such as touch, push, scroll, or the like. The first and second manipulation units 123a and 123b may also employ any non-tactile method such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b can be used in various ways. For example, the first manipulation unit 123a can be used to provide an input to a menu, home key, cancel, search, or the like, and the second manipulation unit 123b may be used by the user to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. For example, the rear input unit may be located on an upper end portion of the rear side of the terminal body such that a user can easily manipulate it using a forefinger when the user grabs the terminal body with one hand. Alternatively, the rear input unit can be positioned at any location on the back side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor to scan a user's fingerprint. The controller 180 can use fingerprint information sensed by the finger scan sensor as part of an authentication procedure. The finger scan sensor can also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located on the back side of the terminal body and includes an image capturing direction that is substantially opposite to the image capturing direction of the first camera unit 121a. If desired, second camera 121a may alternatively be located at other locations, or made to be moveable, in order to have a different image capturing direction from that shown.

The second camera 121b can include a plurality of lenses arranged along at least one axis. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191 that is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is designed to be detachable from the terminal body, the rear case 103 may be detachably coupled to the rear case 102.

An accessory for protecting the appearance of assisting or extending the functions of mobile terminal 100 can also be provided on the mobile terminal 100. An exemplary accessory can be a cover or pouch for covering or accommodating at least one surface of the mobile terminal 100 may be provided. The cover or pouch may cooperate with the display unit 151 to extend the function of the mobile terminal 100. Another exemplary accessory is a touch pen to assist or extend a touch input to a touch screen.

Meanwhile, according to the present invention, information processed by a mobile terminal can be displayed using a flexible display. This is described in more detail with reference to the attached drawing in the following.

Figure 2:
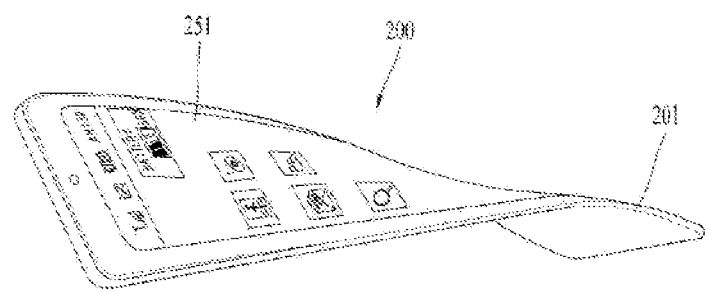
FIG. 2 is a conceptual view of a deformable mobile terminal according to an alternative embodiment of the present disclosure.

FIG. 2 is a conceptual view of a deformable mobile terminal according to an alternative embodiment of the present invention.

In FIG. 2, mobile terminal 200 is shown as having display unit 251, which is a type of display that is deformable by an external force. This deformation, which can apply to display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display that can exhibit characteristics of a conventional flat panel display, but is instead fabricated on a flexible substrate that can be deformed as discussed earlier.

The term e-paper may be used to refer to a display technology employing the characteristic of a general ink, and is different from the conventional flat panel display because it reflects light. E-paper is generally understood as changing displayed information using a twist ball or via electrophoresis using a capsule.

When the flexible display unit 251 is not in a deformed state (for example, in a state with an infinite radius of curvature and referred to as a first state), a display region of the flexible display unit 251 can include a generally flat surface. When the flexible display unit 251 is deformed by an external force (for example, a state with a finite radius of curvature and referred to as a second state), the display region may become a curved surface or a bent surface. As illustrated, information displayed in the deformed state may be visual information output on the curved surface. The visual information may be realized in this manner by independently controlling the light emission of each unit pixel (sub-pixel) arranged in a matrix configuration. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may be used as a flexible touch screen by combining a touch sensor with the display. When a touch is received at the flexible touch screen, the controller 180 can execute certain control corresponding to the touch input. In embodiments, the flexible touch screen can be configured to sense touch and other input while in both the first and second states.

One exemplary option is to configure the mobile terminal 200 to include a deformation sensor which senses the deformation of the flexible display unit 251. The deformation sensor may be included in the sensing unit 140.

The deformation sensor may be located in the flexible display unit 251 or the case 201 to sense information related to the deformation of the flexible display unit 251. Examples of such information related to the deformation of the flexible display unit 251 may be the direction of deformation, the degree of deformation, the position of the deformation, the amount of time the deformation has lasted, the speed at which the deformed flexible display unit 251 is restored, and the like. Other possibilities include any type of information which can be sensed in response to the curving of the flexible display unit or sensed while the flexible display unit 251 is transitioning into, or existing in, the deformed and flat states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown as having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 251, taking into account the characteristic of the flexible display unit 251. One technique to implement such a battery is to use a stack and folding method of stacking battery cells.

The deformation of the flexible display unit 251 is not limited to application of an external force. For example, the flexible display unit 251 can be deformed into the second state from the first state by a user command, application command, or the like.

In accordance with still further embodiments, a mobile terminal may be configured as a wearable device. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
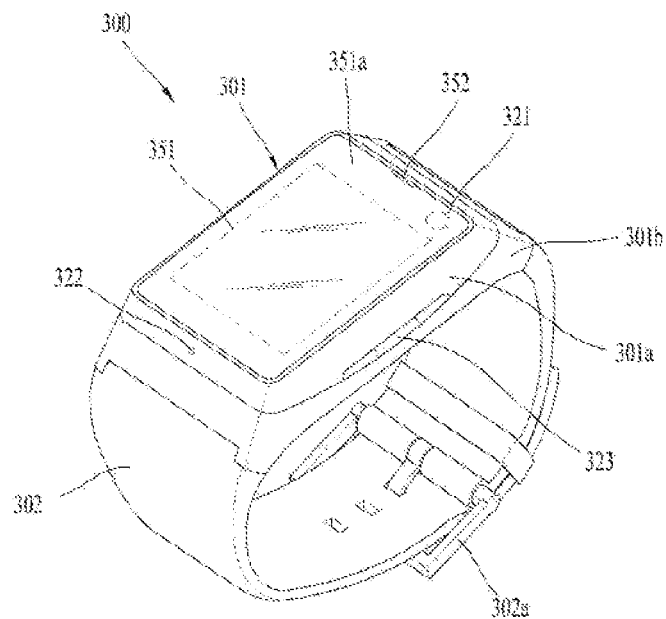
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment.

As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b that together define an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication. An antenna for the wireless communication can be installed in the main body 301. The function of the antenna may may be enclosed by the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 can be worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used to enhance the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
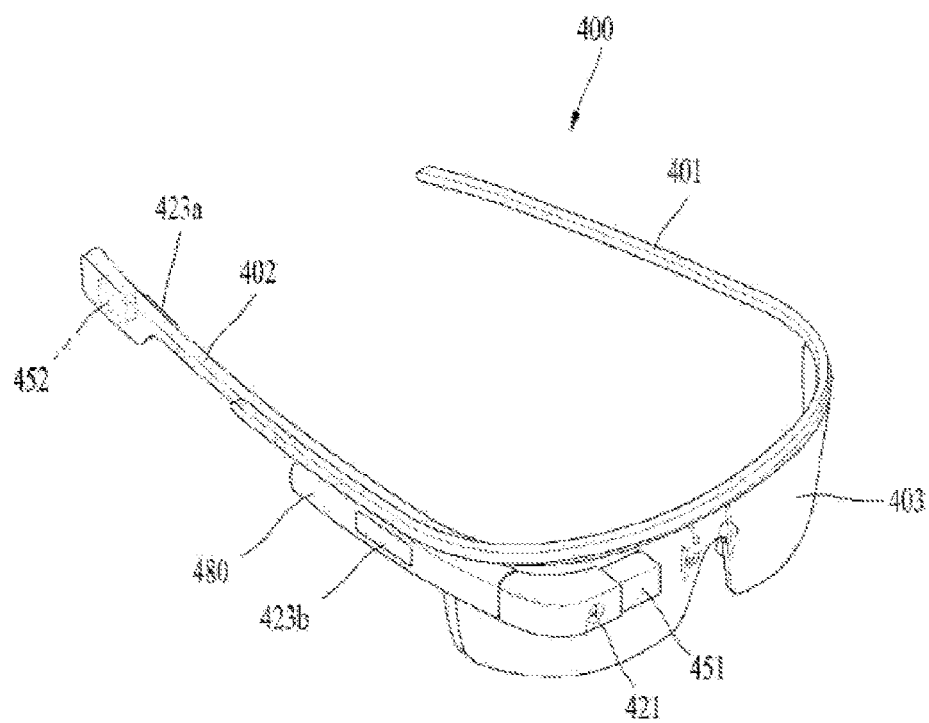
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment.

The glass-type mobile terminal 400 can be wearable on a head of a human body and provided with a frame (case, housing, etc.) therefor. The frame may be made of a flexible material to be easily worn. The frame of mobile terminal 400 is shown as having a first frame 401 and a second frame 402, which can be made of the same or different materials. Mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may correspond to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing.

The camera 421 may be positioned at any location on the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable pressing or touching as they are respectively located on the frame part and the control module 480.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be placed close to the head when the user wears the mobile terminal 400 and vibrate the user's skull to transfer sounds.

A communication system which is operable with the variously described mobile terminals will now be described in more detail.

Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal.

Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, a short range mobile payment may be executed when a mobile terminal having card information on a payment card (e. g, a credit card or a bus card) approaches a card reader. As another example, an entrance approval procedure may start when a mobile terminal which stores card information on an entrance card approaches an entrance card reader. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

In the following, embodiments shown in FIG. 5 to FIG. 26 show a method of easily playing videos of timings different from each other and videos from angles where playing a video captured with viewing angle area of a mobile terminal corresponds to 360 degrees.

In the embodiments exemplified in FIG. 5 to FIG. 26, a mobile terminal can include a display unit, a sensing unit and a controller. The display unit may correspond to a display unit 151 shown in FIG. 1a and can be implemented in a touch screen form. The display unit can display a multi-view video corresponding to a video in which all directions (omnidirectional) are captured. The multi-view video may correspond to a video captured by a camera mounted on a mobile terminal or a video received from an external source. The sensing unit may correspond to a user input unit 123 or a sensing unit 140 shown in FIG. 1a. For example, the sensing unit can sense an input signal inputted by a user. The input signal can include a short touch, a long touch, a drag touch, a pinch-out touch, a pinch-in touch, a double-tap touch and the like. The controller can control the display unit and the sensing unit to play a video in which 360 degrees are captured.

In the following, regarding the embodiments of FIG. 5 to FIG. 26, operations performed in the mobile terminal can be controlled by the controller 180 shown in FIG. 1a. For clarity, the operations are commonly depicted and explained as being performed or controlled by the mobile terminal.

Figure 5:
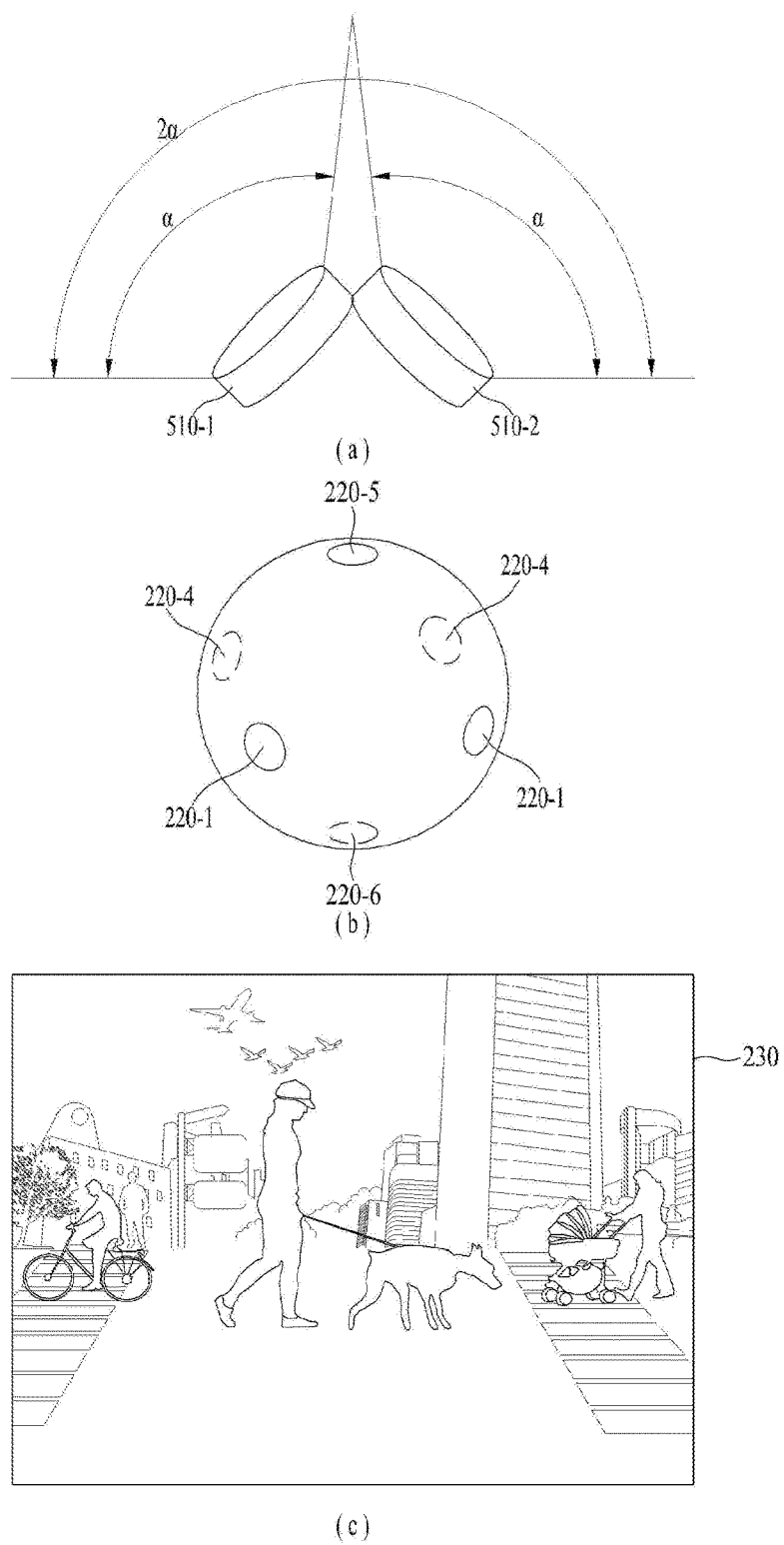
FIG. 5 is a diagram for an example of a multi-view video displayed in a mobile terminal according to one embodiment of the present invention.

FIG. 5 is a diagram of an exemplary multi-view video displayed in a mobile terminal according to one embodiment of the present invention.

When capturing a video via a plurality of cameras at the same time, it is possible to capture a wide angle video or a wide angle image including a viewing angle area wider than a viewing angle area captured by a single camera.

For example, as shown in FIG. 5(a), if two cameras 510-1/510-2 each of which has a viewing angle corresponds to a are used at the same time, thus it is possible to capture an image or a video with a maximum viewing angle corresponding to 2α. In this case, a viewing angle area indicates a range of a horizontal and vertical angle of view capable of being included in a screen captured by a camera. The viewing angle area may indicate an area within a prescribed angle in the front direction of a camera. For example, a viewing angle area of a camera may correspond to ±60 degrees from the center of a lens. The present invention is not so limited.

If the number of cameras is increased, then it is possible to capture an image with a viewing angle area corresponding to 360 degrees with respect to a prescribed axis. For example, as shown in FIG. 5 (*b*), if 6 cameras 220-1 to 220-6 are used and properly arranged, it is possible to capture an image with a viewing angle area corresponding to 360 degrees with respect to a prescribed axis.

As shown in FIG. 5 (*b*), an image or a video captured by a plurality of cameras can be provided to a user in various forms. For example, an image or a video in which 360 degrees are captured can be schematized in a cylinder or a rectangular form. Yet, in this case, it may be difficult for a user to recognize the image or the video in which 360 degrees are captured at once. For example, referring to FIG. 5 (*c*), the image or the video in which 360 degrees are captured can be schematized in a rectangular form 230. In this case, although a multi-view image or video can be expressed as being somewhat distorted from reality, a user can easily recognize the image or video in which 360 degrees are captured at once. In exemplary embodiments of the present invention, the displayed multi-view video can be expressed in a rectangular form. The displayed multi-view video can correspond to a video captured by 6 cameras and the multi-view video provided can be divided into 6 viewing angle areas. The number of viewing angle areas included in the multi-view video should not be viewed as-limited to 6. It is possible to implement any number of viewing angle areas in various ways.

FIG. 6 is a diagram for an example of an indicator of a multi-view video displayed in a mobile terminal according to one embodiment of the present invention.

As mentioned in the foregoing description, since a multi-view video corresponds to a video of which 360 degrees captured at one time, if images of 360 degrees are displayed at the same time, it may be difficult for a user to clearly recognize the captured video. Hence, when the multi-view video is played, a mobile terminal can play the multi-view video by separating each viewing angle range from the others and may inform a user of a currently played viewing angle range via a viewing angle indicator.

In this case, the viewing angle indicator can appear in various ways. Referring to FIG. 6 (*a*), the viewing angle indicator can appear as an unfolded form of a cube. In this case, although it is difficult to include the entire rectangular image shown in FIG. 5 (*c*) by the unfold form of the cube, a user can easily recognize a viewing angle by which video is sensed on the basis of a prescribed direction. As mentioned earlier in FIG. 5, the multi-view video corresponds to a video captured by 6 cameras in the present invention. Each face of the cube may correspond to a video sensed by a single camera. In the following embodiments of FIG. 7 to FIG. 25, assume that a viewing angle indicator is depicted as an unfolded cube.

For illustrative purposes, an exemplary embodiment having an exemplary viewing angle indicator shown in FIG. 7 to FIG. 25 as including viewing first viewing angle 611, a second viewing angle 612, a third viewing angle 613, a fourth viewing angle 614, a fifth viewing angle 615 and a sixth viewing angle 616. For example, the first viewing angle 611 may correspond to a left area on the basis of the second viewing angle 612 and the third viewing angle 613 may correspond to a right area on the basis of the second viewing angle 612. The fourth viewing angle 614 may correspond to a rear area on the basis of the second viewing angle 612. The fifth viewing angle 615 may correspond to an upper area of the first to the fourth viewing angle and the sixth viewing angle 616 may correspond to a bottom area of the first to the fourth viewing angle. Although a viewing angle area of a multi-view video is explained in a manner of being divided into 6 areas in the present invention, this is done only for illustrative purposes, the number of viewing angle areas can be increased or decreased depending on a given configuration.

Referring to FIG. 6 (*b*), a viewing angle indicator can appear in a cube form. In this case, similar to a scheme of FIG. 6 (*a*), the viewing angle indicator can include a first viewing angle 621, a second viewing angle 622, a third viewing angle 623, a fourth viewing angle 624, a fifth viewing angle 625 and a sixth viewing angle 626. Referring to FIG. 6 (*c*), a viewing angle indicator can appear with a cylindrical shape. In this case, a user can recognize a currently displayed viewing angle area using a highlight display 631. the type of viewing angle indicator should limited the embodiment of FIG. 16. The viewing angle indicator can appear in many different ways.

Change of Playback Time and Playback Viewing Angle of Multi-View Video

Figure 7:
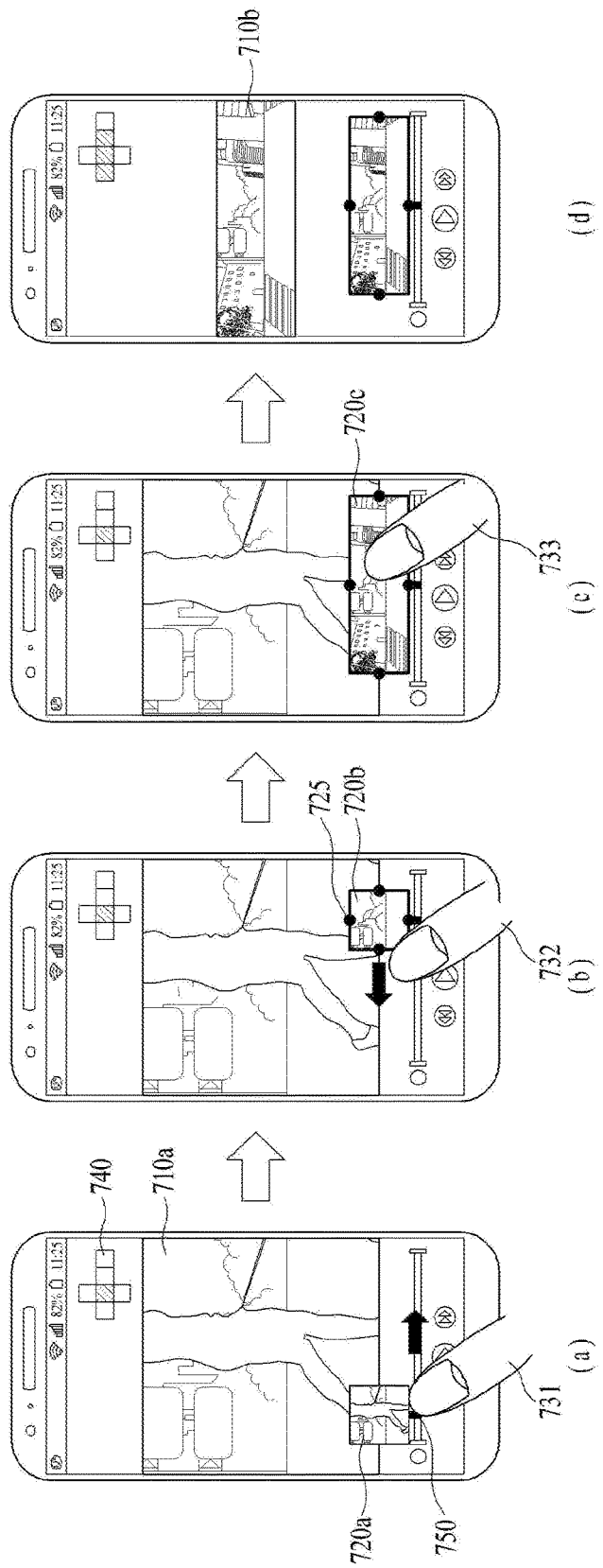
FIG. 7 is a diagram for an example of changing playback time and a playback viewing angle of a multi-view video displayed in a mobile terminal according to one embodiment of the present invention.
Figure 8:
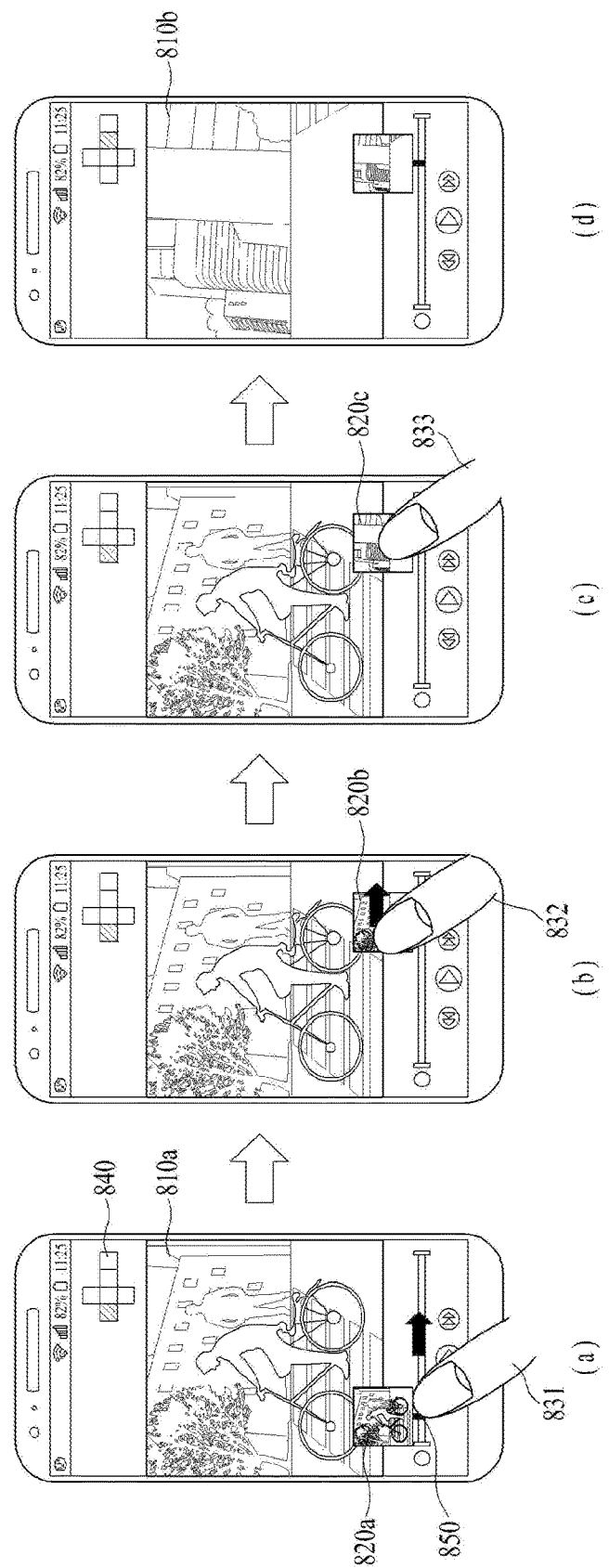
FIG. 8 is a diagram for an example of changing playback time and a playback viewing angle of a multi-view video displayed in a mobile terminal according to one embodiment of the present invention.

FIG. 7 and FIG. 8 described in the following show a method of changing playback time and a playback viewing angle of a multi-view video using various touch inputs inputted on a progress bar.

FIG. 7 is a diagram for an example of changing playback time and a playback viewing angle of a multi-view video displayed in a mobile terminal according to one embodiment of the present invention.

Although it is not depicted in FIG. 7, a mobile terminal can sense an input signal for playing a multi-view video among a plurality of multi-view videos when a gallery application is executed. In this case, the mobile terminal can display a frame 710*a* corresponding to a first viewing angle area among frames of 360 degrees of a first time of the multi-view video on the display unit. For example, the first time point may correspond to a first point of the multi-view video. In an embodiment of FIG. 7, the first time point may correspond to a time designated by a user. The first viewing angle area may correspond to one like the second viewing angle 612 mentioned earlier in FIG. 6.

In this case, the mobile terminal can display a progress bar corresponding to a multi-view video on the display unit. The progress bar may correspond to an interface for indicating such information as a length of the whole video, a currently played time and the like when the video is played. The progress bar can include a time indicator 750 indicating the time of a frame 710*a* currently displayed on the display unit. The progress bar can display a first thumbnail image 720*a* indicating the currently displayed frame 710*a* on a position adjacent to the time indicator 750. The thumbnail image 720*a* cannot be displayed continuously. If an input signal is not inputted on the progress bar within prescribed time after the first thumbnail image 720*a* is displayed, the thumbnail image 720*a* can be deleted.

In the exemplary embodiment of FIG. 7 (*a*), the mobile terminal can sense a first input signal 731 inputted on the time indicator 750. In this case, the first input signal 731 may correspond to a drag touch input dragged in the right direction. In this case, the mobile terminal can display the time indicator 750 on a position at which the first input signal 731 is ended. In this case, as shown in FIG. 7 (*b*), while the frame 710a displayed on the display unit is not changed, the mobile terminal can display a thumbnail image on the progress bar changing the thumbnail image from the first thumbnail image to a second thumbnail image 720b. In this case, the second thumbnail image 720b may correspond to a thumbnail image corresponding to a first displayed angle area in a frame of a second time point of a multi-view video. In particular, the first thumbnail image 720a and the second thumbnail image 720b correspond to thumbnails of frame images from different times for the same viewing angle.

Meanwhile, although it is not depicted in FIG. 7 (b), the mobile terminal can sense an input signal (not depicted) inputted on the second thumbnail image 720b. In this case, the input signal (not depicted) may correspond to a long touch input. The input signal (not depicted) can be sensed at an edge or an internal area of the second thumbnail image 720b. In this case, as shown in FIG. 7 (b), the mobile terminal can display a thumbnail editing indicator 725. For example, the thumbnail editing indicator 725 can indicate that the mobile terminal has entered a mode for enlarging or reducing a size of a thumbnail image. The thumbnail editing indicator 725 can appear at an edge of a thumbnail image and can appear in various forms.

The mobile terminal can sense a second input signal 732 inputted on the thumbnail editing indicator 725. The second input signal 732 may for example correspond to a drag touch input dragged in the left direction. The second input signal can correspond to any predetermined touch and thus is not limited to a drag touch.

Referring to FIG. 7 (c), the mobile terminal can display a third thumbnail image 720c in response to the second input signal 732. The third thumbnail image 720c may correspond to a thumbnail image corresponding to a second viewing angle area in a frame of a second time point of a multi-view video. The third thumbnail image 720c corresponds to a thumbnail image corresponding to an image of a viewing angle area wider than a viewing angle area of the first thumbnail image 720a or the second thumbnail image 720b. Hence, the second viewing angle area may correspond to a viewing angle wider than the first viewing angle area.

The mobile terminal can sense a third input signal 733 inputted on the third thumbnail image 720c. The third input signal may for example correspond to a short touch input. Other commands may also be used for the third input signal. As shown in FIG. 7 (d), the mobile terminal can display a frame 710b corresponding to the third thumbnail image 720c. In particular, the mobile terminal can display a frame corresponding to the second viewing angle area of a second time point of a multi-view video. As shown in FIG. 7 (d), the viewing angle indicator 740 may change to indicate the first viewing angle area and the second viewing angle area. If an input signal is not inputted within predetermined duration after the third thumbnail image 720c is displayed, the third thumbnail image can be deleted. If an input signal inputted on a playback icon is sensed, the mobile terminal can play a multi-view video for the second viewing angle area from the second time point.

FIG. 8 is a diagram for an example of changing playback time and a playback angle of a multi-view video displayed in a mobile terminal according to one embodiment of the present invention. In an embodiment of FIG. 8, explanation on contents overlapped with the contents of FIG. 7 is omitted.

Referring to FIG. 8 (a), the mobile terminal can display a frame 810a corresponding to a first viewing angle area of a first time point of a multi-view video on the display unit. The mobile terminal can display a time indicator 850 and a first thumbnail image 820a indicating a frame corresponding to the first viewing angle area of the first time point on a position corresponding to the first time point on the progress bar. The mobile terminal can sense a first input signal 831 inputted on the time indicator 850.

In this case, as shown in FIG. 8 (b), the mobile terminal can change a position of the time indicator 850 to a position at which the first input signal 831 is ended. The mobile terminal can display a second thumbnail image 820b on the time indicator 850. In this case, since the second thumbnail image 820b is identical to the second thumbnail image mentioned earlier in FIG. 7, explanation on the second thumbnail image 820b is omitted at this time.

The mobile terminal can sense a second input signal 832 inputted on the second thumbnail image 820b. The second input signal 832 can correspond to a drag touch input dragged in the right direction. Other commands may also be used to enter the second input signal. The second input signal 832 may correspond to a drag touch input starting from an internal area of the second thumbnail image 820b instead of an edge of the second thumbnail image 820b.

As shown in FIG. 8 (c), the mobile terminal can display a third thumbnail image 820c. In this case, the third thumbnail image 820c may correspond to a thumbnail image corresponding to a second viewing angle area of a second time point of a multi-view video. The third thumbnail image 820c may correspond to a thumbnail image corresponding to an image of a viewing angle range identical to the viewing angle range of the first thumbnail image 820a and the second thumbnail image 820b. For example, although the third thumbnail image 820c and the first and the second thumbnail image 820a/820b correspond to thumbnails indicating viewing angle areas different from each other, the thumbnails may correspond to thumbnails corresponding to an angle of 60 degrees among 360 degrees. In particular, the mobile terminal can provide a preview of an image of a different viewing angle on a thumbnail image indicating an identical viewing angle area by a drag touch sensed on the thumbnail image.

The mobile terminal can sense a third input signal inputted on the third thumbnail image 820c. As shown in FIG. 8 (d), the mobile terminal can display a frame 810b corresponding to the third thumbnail image 820c. The mobile terminal can change the viewing angle indicator to indicate a third viewing angle area.

In particular, a user can easily change and use a playback time and a playback viewing angle of a multi-view video by performing a simple operation on the progress bar via the aforementioned embodiments.

Change of Viewing Angle Area when a Multi-View Video is not Played.

Figure 9:
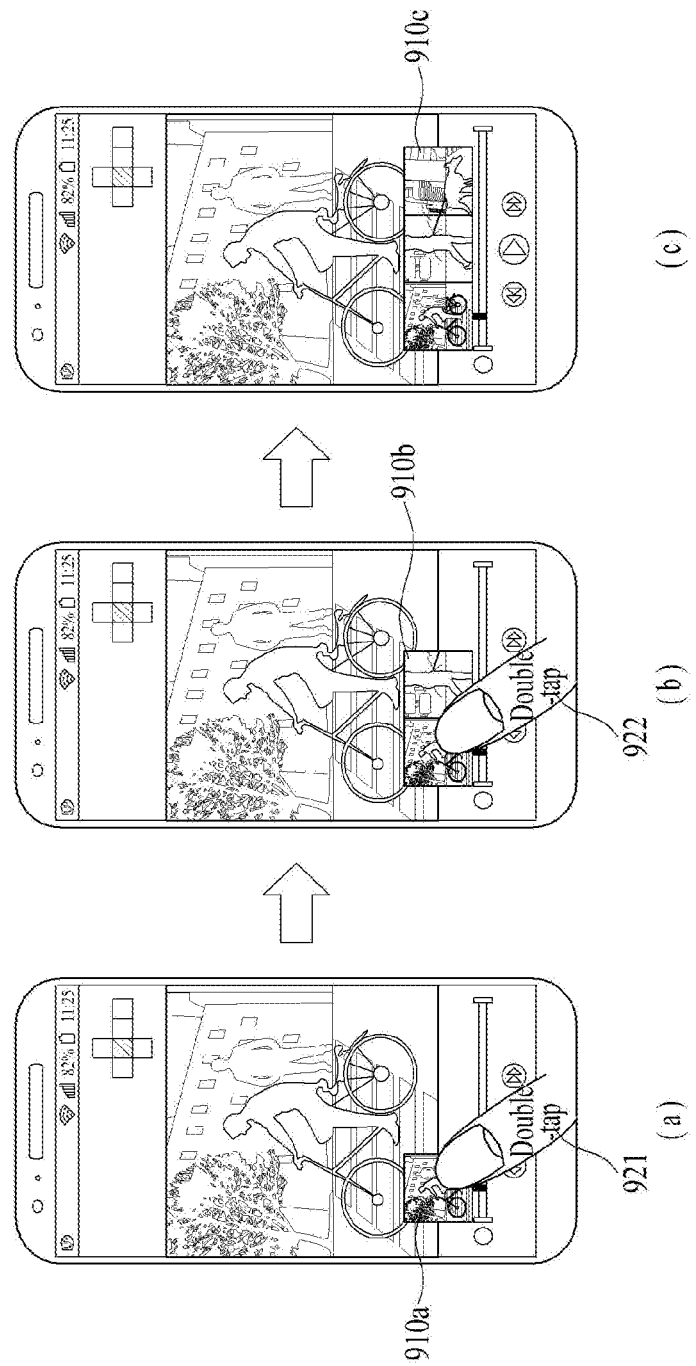
FIG. 9 is a diagram for an example of changing a playback viewing angle of a thumbnail image of a multi-view video displayed in a mobile terminal according to one embodiment of the present invention.

FIG. 9 to FIG. 15 show an exemplary method of changing a viewing angle area when the playback of a multi-view video is stopped. More specifically, an embodiment of FIG. 9 shows a method of changing a viewing angle area of a thumbnail and embodiments of FIG. 9 to FIG. 15 show a method of changing an angle area of a frame.

FIG. 9 is a diagram for an exemplary embodiment of changing a playback viewing angle of a thumbnail image of a multi-view video displayed in a mobile terminal according to one embodiment of the present invention. In an embodiment of FIG. 9, explanation on contents overlapped with the contents of FIG. 8 is omitted.

As shown in FIG. 9 (a), the mobile terminal can display a frame 910a corresponding to a first viewing angle area of a first time point of a multi-view video on the display unit.

The mobile terminal can display a time indicator 930 and a first thumbnail image 910a indicating a preview of a frame corresponding to the first viewing angle area at a first time point on a position corresponding to the first time point on the progress bar.

The mobile terminal can sense a first input signal 921 inputted on the first thumbnail image 910a. The first input signal 921 can correspond to a double-tap touch input. Other commands may also be used. In this case, as shown in FIG. 9 (b), the mobile terminal can display a second thumbnail image 910b on a position adjacent to the first thumbnail image 910a. The second thumbnail image 910b may correspond to an image indicating a preview of a frame adjacent to a frame corresponding to the first thumbnail image 910a. For example, if the first thumbnail image 910a corresponds to a preview of a frame corresponding to a first viewing angle area of a first time point, the second thumbnail image 910b may correspond to a preview of a frame corresponding to a second viewing angle area of the first time point. Referring to FIG. 9 (b), although a viewing angle area of a thumbnail image displayed on the progress bar changes, a frame and the viewing angle area of the viewing angle indicator can be maintained as it is.

The mobile terminal can sense a second input signal 922 inputted on the second thumbnail image 910b. The second input signal 922 can correspond to a double-tap touch input. Other commands may be used to. In this case, as shown in FIG. 9 (c), the mobile terminal can display a third thumbnail image 910c on a position adjacent to the second thumbnail image 910b. For example, if the second thumbnail image 910b corresponds to a preview of a frame corresponding to a second viewing angle area of a first time point, the third thumbnail image 910c may correspond to a preview of a frame corresponding to a third viewing angle area of the first time point.

Although it is not depicted in FIG. 9, if an additional input signal is sensed on the first thumbnail image 910, the mobile terminal may display a fourth thumbnail image (not depicted). A plurality of thumbnail images can be displayed in a manner of being arranged in a row or being adjacently arranged in up and down. A user can easily use a preview of a frame of various viewing angle areas for the time point of the currently displayed frame.

Figure 10:
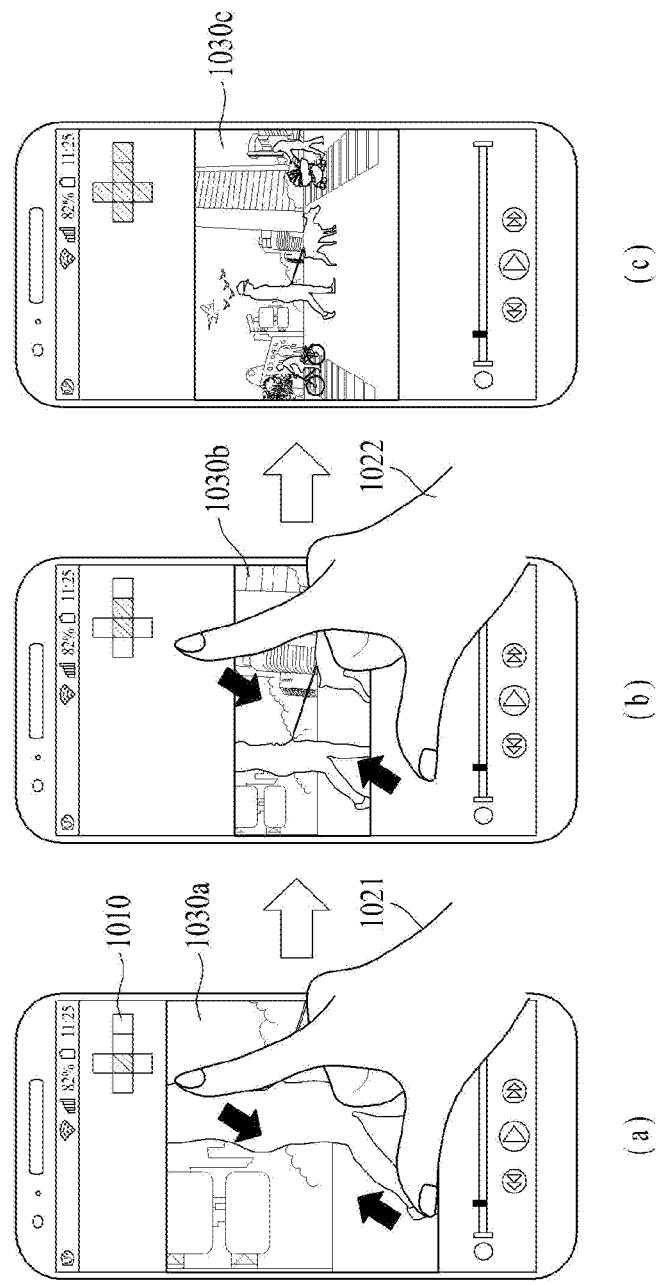
FIG. 10 is a diagram for an example of changing a playback viewing angle of a multi-view video displayed in a mobile terminal according to one embodiment of the present invention.

FIG. 10 is a diagram for an example of changing a playback viewing angle of a multi-view video displayed in a mobile terminal according to one embodiment of the present invention.

Referring to FIG. 10 (a), the mobile terminal can display a frame 1030a corresponding to a first viewing angle area of a first time point of a multi-view video on the display unit. The mobile terminal can display a viewing angle indicator 1010. The viewing angle indicator can indicate a corresponding viewing angle range of the currently displayed frame among 360 degrees. In an embodiment of FIG. 10 (a), the viewing angle indicator 1010 can highlight an area corresponding to the first viewing angle area. In the embodiment of FIG. 10 (a), the first viewing angle area may correspond to the second viewing angle mentioned earlier in FIG. 6 (a).

The mobile terminal can sense a first input signal 1021 inputted on a frame 1030a. The first input signal 1021 can correspond to a pinch-in touch input. Other commands may also be used. In this case, as shown in FIG. 10 (b), the mobile terminal can display a frame 1030b corresponding to a second viewing angle area of a first time point. The second viewing angle area may correspond to a viewing angle range wider than the first viewing angle area. In an embodiment of FIG. 10 (b), the viewing angle indicator 1010 can highlight an area corresponding to the second viewing angle area. In the embodiment of FIG. 10 (b), the second viewing angle area may correspond to a viewing angle including the second viewing angle and the third viewing angle mentioned earlier in FIG. 6 (a).

Figure 11:
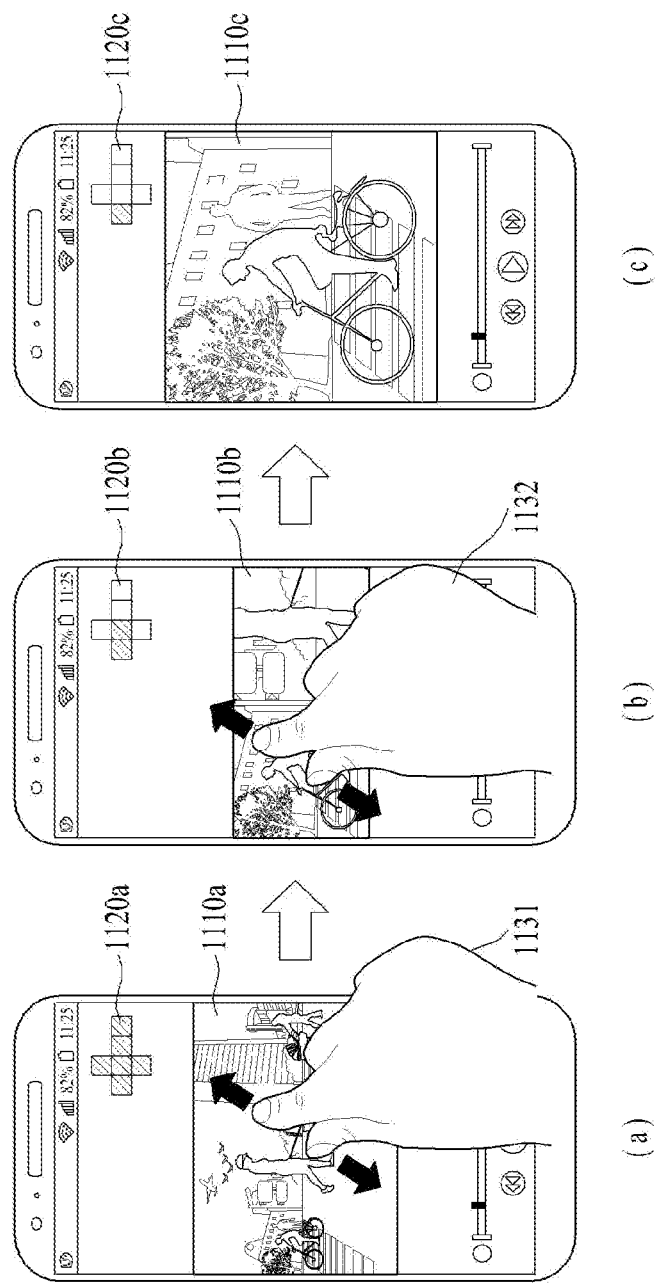
FIG. 11 is a diagram for an example of changing a playback viewing angle of a multi-view video displayed in a mobile terminal according to one embodiment of the present invention.

The mobile terminal can sense a second input signal 1022 inputted on a frame 1030b. The second input signal 1022 can correspond to a pinch-in touch input. Other commands may also be used. In this case, as shown in FIG. 10 (c), the mobile terminal can display a frame 1030c corresponding to a third viewing angle area of a first time point. The third viewing angle area may correspond to a viewing angle range wider than the second viewing angle area. For example, in an embodiment of FIG. 10 (c), the third viewing angle area may correspond to 360 degrees. In the embodiment of FIG. 10 (c), the viewing angle indicator 1010 can highlight an area corresponding to the third viewing angle area. FIG. 11 is a diagram for an exemplary change of a playback viewing angle of a multi-view video displayed in a mobile terminal according to one embodiment of the present invention. In an embodiment of FIG. 11, explanation on contents overlapped with the contents of FIG. 10 is omitted. The embodiment of FIG. 11 may correspond to an embodiment opposite to the aforementioned embodiment of FIG. 10.

Referring to FIG. 11 (a), the mobile terminal can display a frame 1110a corresponding to a first viewing angle area of a first time point of a multi-view video on the display unit. The mobile terminal can display a viewing angle indicator 1120. In an embodiment of FIG. 11 (a), the viewing angle indicator 1120 can highlight an area corresponding to the first viewing angle area. In the embodiment of FIG. 11 (a), the first viewing angle area can include the aforementioned first to the sixth viewing angles mentioned earlier in FIG. 6 (a).

The mobile terminal can sense a first input signal 1131 inputted on a frame 1110a. In this case, the first input signal 1021 corresponds to a pinch-out touch input. Other commands may also be used. In this case, as shown in FIG. 11 (b), the mobile terminal can display a frame 1110b corresponding to a second viewing angle area of a first time point. In this case, the second viewing angle area may correspond to a viewing angle range narrower than the first viewing angle area. In an embodiment of FIG. 11 (b), the viewing angle indicator can highlight an area corresponding to the second viewing angle area. In the embodiment of FIG. 11 (b), the second viewing angle area may correspond to a viewing angle including both the first viewing angle and the second viewing angle mentioned earlier in FIG. 6 (a).

The mobile terminal can sense a second input signal 1132 inputted on a frame 1110c. The second input signal 1132 can correspond to a pinch-out touch input. Other commands may also be used. In this case, as shown in FIG. 11 (c), the mobile terminal can display a frame 1110c corresponding to a third viewing angle area of a first time point. The third viewing angle area may correspond to a viewing angle range narrower than the second viewing angle area. In an embodiment of FIG. 11 (c), the viewing angle indicator can highlight an area corresponding to the third viewing angle area. In the embodiment of FIG. 11 (c), the third viewing angle area may correspond to the first angle mentioned earlier in FIG. 6 (a).

A user can easily change a playback viewing angle of a multi-view video using a pinch-in touch or a pinch-out touch via the aforementioned embodiments of FIG. 10 and FIG. 11. If a pinch-out touch is inputted, the mobile terminal can provide a user with an enlarged view of a frame for an identical time. If a pinch-in touch is inputted, the mobile terminal can provide a user with a reduced view of a frame for an identical time.

Figure 12:
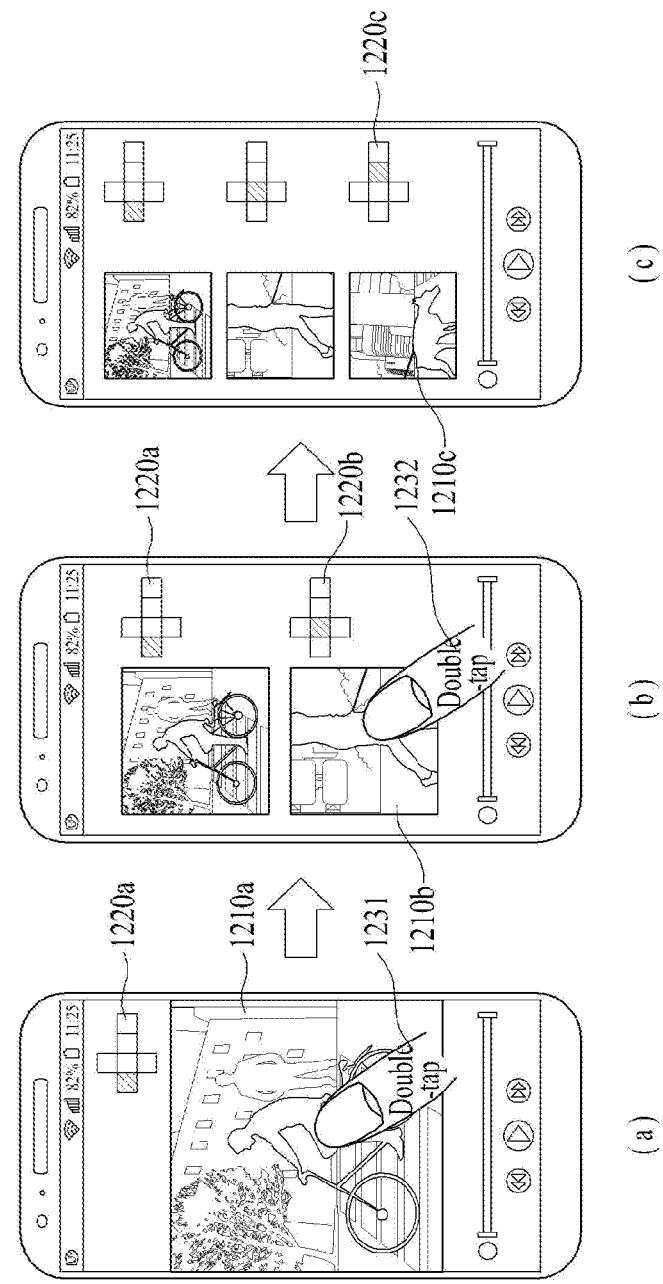
FIG. 12 is a diagram for an example of displaying a plurality of playback viewing angles included in a multi-view video displayed in a mobile terminal at the same time according to one embodiment of the present invention.

FIG. 12 is a diagram exemplifying simultaneously displaying a plurality of playback viewing angles included in a multi-view video displayed in a mobile terminal according to one embodiment of the present invention.

Referring to FIG. 12 (a), the mobile terminal can display a first frame 1210a corresponding to a first viewing angle area of a first time point of a multi-view video on the display unit. The viewing angle indicator 1220a can highlight an area corresponding to a viewing angle area of the first frame 1210a. For example, in an embodiment of FIG. 12 (a), the first angle area may correspond to the first viewing angle mentioned earlier in FIG. 6 (a).

The mobile terminal can sense a first input signal 1231 inputted on the first frame 1210a. The first input signal 1231 can correspond to a double-tap touch input. Other commands may also be used to input the first input signal. In this case, as shown in FIG. 12 (b), the mobile terminal can additionally display a second frame 1210b corresponding to a second viewing angle area of a first time point of a multi-view video on the display unit. In particular, the mobile terminal can display the first frame 1210a and the second frame 1210b at the same time in response to the first input signal 1231. In this case, since it is necessary to display two frames at the same time, the first frame 1210a and the second frame 1210b are displayed having a smaller size than the size of the first frame 1210a shown in FIG. 12 (a). The mobile terminal can display a viewing angle indicator 1220b corresponding to the second frame together with the second frame. In this case, the viewing angle indicator 1220b can be displayed while an area corresponding to the second viewing angle area is highlighted. For example, in the embodiment of FIG. 12 (b), the second viewing angle area may correspond to the second viewing angle mentioned earlier in FIG. 6 (a).

The mobile terminal can sense a second input signal 1232 inputted on the second frame 1210b. The second input signal 1232 can correspond to a double-tap touch input. Other commands may also be used to enter the second input signal. In this case, as shown in FIG. 12 (c), the mobile terminal can additionally display a third frame 1210c corresponding to a third viewing angle area of a first time point on the display unit. In particular, the mobile terminal can display the first frame 1210a, the second frame 1210b and the third frame 1210c at the same time point in response to the second input signal 1232. In this case, each frame can be displayed with a smaller size.

The mobile terminal can display a viewing angle indicator 1220c corresponding to the third frame 1210c together with the third frame. In this case, the viewing angle indicator 1220c can be displayed while an area corresponding to the third viewing angle area is highlighted. For example, in the embodiment of FIG. 12 (c), the third viewing angle area may correspond to the third viewing angle mentioned earlier in FIG. 6 (a).

Figure 13:
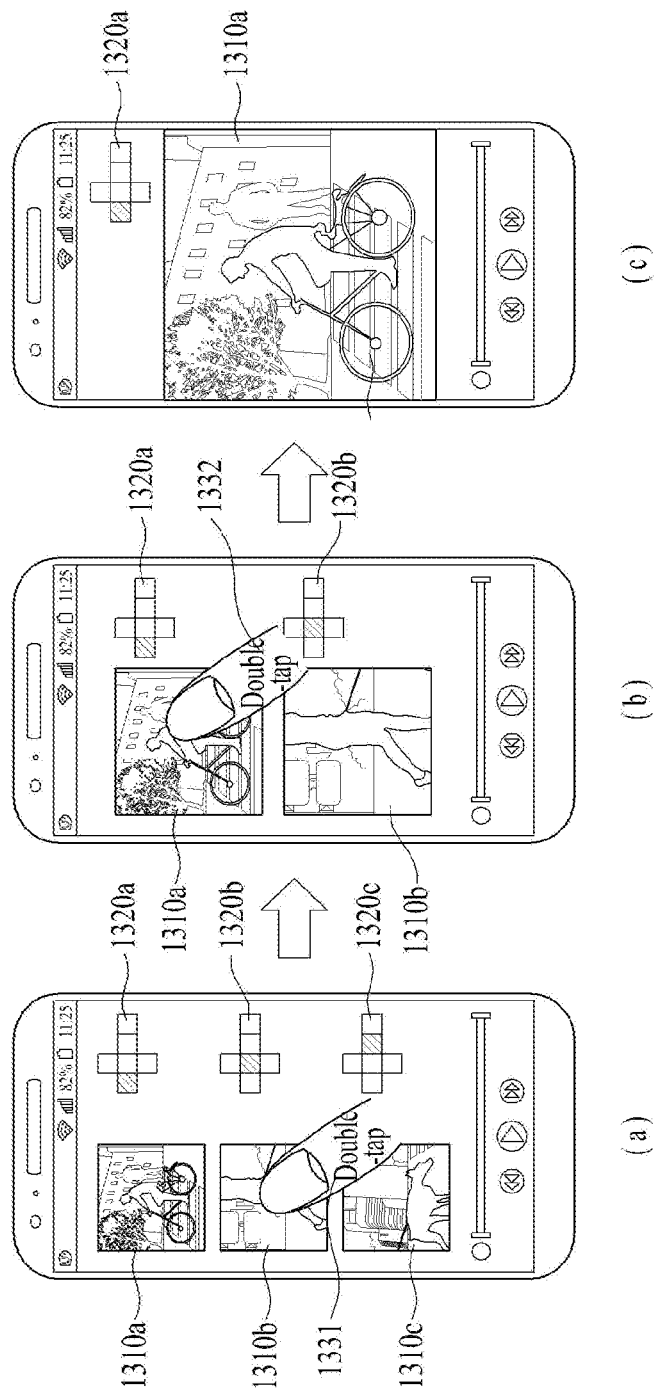
FIG. 13 is a diagram for an example of displaying a plurality of playback viewing angles included in a multi-view video displayed in a mobile terminal at the same time according to one embodiment of the present invention.

FIG. 13 is a diagram of an exemplary simultaneous display of a plurality of playback viewing angles included in a multi-view video displayed in a mobile terminal at the same time according to one embodiment of the present invention.

In an embodiment of FIG. 13, explanation on contents overlapped with the contents of FIG. 12 is omitted. The embodiment of FIG. 13 may correspond to an embodiment opposite to the embodiment of FIG. 12.

Referring to FIG. 13, the mobile terminal can display a first frame 1310a, a second frame 1310b and a third frame 1310c corresponding to a first time of a multi-view video on the display unit. In an exemplary embodiment, the first frame 1310a, the second frame 1310b and the third frame 1310c can be identical to the first frame to the third frame mentioned earlier in FIG. 12. The mobile terminal can display a viewing angle indicator 1320a corresponding to the first frame 1310a, a viewing angle indicator 1320b corresponding to the second frame 1310b and an angle indicator 1320c corresponding to the third frame 1310c.

The mobile terminal can sense a first input signal 1331 inputted on the remaining frames other than the recently displayed frame among a plurality of frames. Referring to FIG. 13 (a), the mobile terminal can sense the first input signal 1331 on a second frame 1310b. In an embodiment of FIG. 13, a third frame 1310c corresponds to the last added and displayed frame. The first input signal 1331 can correspond to a double-tap touch input. Other commands may also be used.

As shown in FIG. 13 (b), the mobile terminal eliminates the third frame 1310c from the display unit and may be able to display only the first frame 1310a and the second frame 1301b. In this case, the first frame 1310a and the second frame 1310b can be displayed with an enlarged size.

The mobile terminal can sense a second input signal 1332 inputted on the remaining frames other than the recently displayed frame among a plurality of frames. Referring to FIG. 13 (b), the mobile terminal can sense the second input signal 1332 on the first frame 1310a. In the embodiment of FIG. 13, the second frame 1310b can correspond to a frame displayed after the first frame 1310a. In this case, the second input signal 1332 can correspond to a double-tap touch input. Other commands may also be used. In this case, as shown in FIG. 13 (c), the mobile terminal eliminates the second frame 1310b from the display unit and may be able to display only the first frame 1310a. In this case, the first frame 1310a can be displayed with an enlarged size.

The second input signal 1332 may correspond to an input signal inputted on a recently displayed frame among a plurality of displayed frames. In particular, referring to FIG. 13 (b), the second frame may correspond to a frame recently displayed compared to the first frame 1310a. Although not depicted in FIG. 13 (b), if a double-tap touch input is sensed on the first frame 1310a, the mobile terminal may return to a state of FIG. 13 (a). In particular, a user can easily determine whether to watch images of various angle areas of an identical time point according to a position on which a touch input is put.

In the embodiments of FIG. 12 and FIG. 13, if a plurality of frames are displayed for an identical time point, the mobile terminal may be able to delete a part of the plurality of the frames or may be able to add a new frame to the plurality of the frames according to a position on which an input signal is sensed.

Figure 14:
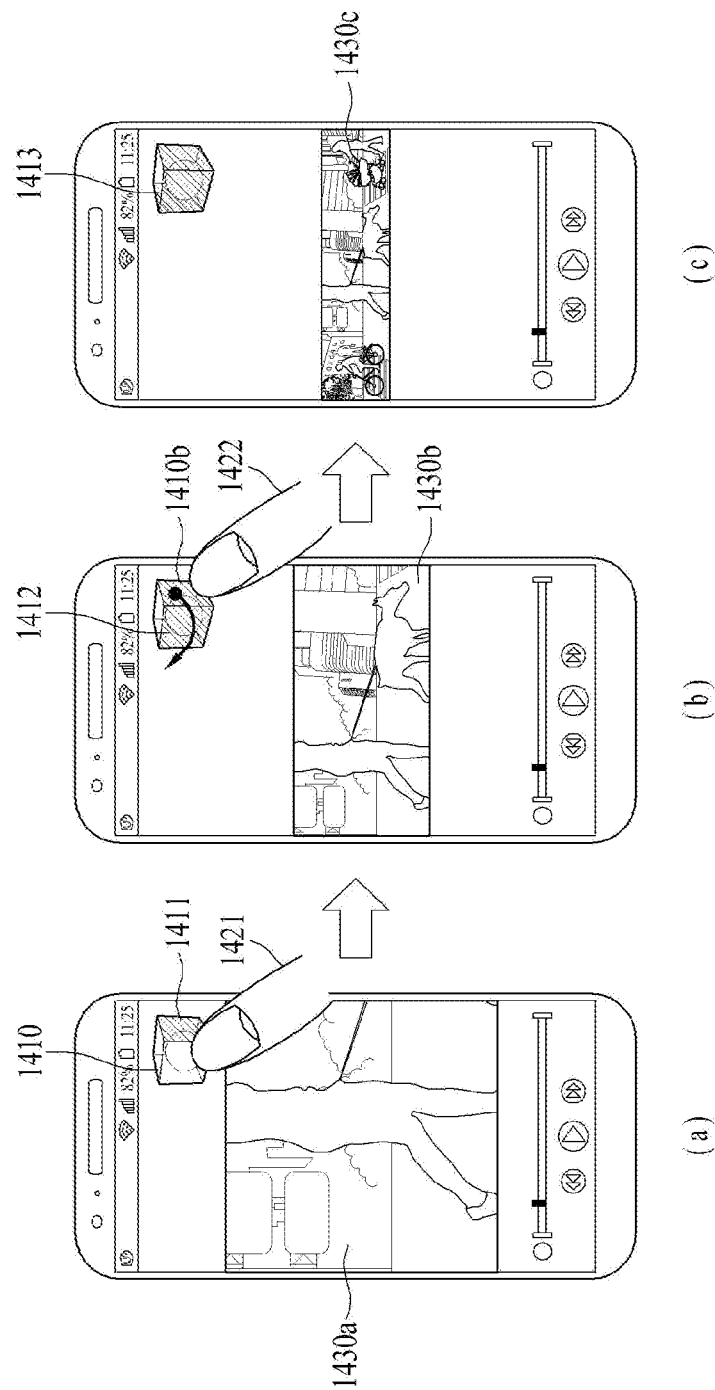
FIG. 14 is a diagram for an example of changing a playback viewing angle according to an input signal inputted on an angle indicator in a multi-view video displayed in a mobile terminal according to one embodiment of the present invention.

FIG. 14 is a diagram for an example of changing a playback viewing angle according to an input signal inputted on a viewing angle indicator in a multi-view video displayed in a mobile terminal according to one embodiment of the present invention. In an embodiment of FIG. 14, the viewing angle indicator can be implemented as a cube described earlier with respect to FIG. 6 (b).

Referring to FIG. 14 (a), the mobile terminal can display a first frame 1430a corresponding to a first viewing angle area of a first time point of a multi-view video. The viewing angle indicator 1410 can highlight an area 1411 corresponding to the first viewing angle area. For example, in an embodiment of FIG. 14 (*a*), the first viewing angle area may correspond to the first viewing angle 621 mentioned earlier in FIG. 6 (*b*).

The mobile terminal can sense a first input signal 1421 inputted on the angle indicator 1410. The first input signal 1421 can correspond to a short touch input. Other commands may also be used. The first input signal 1421 can be sensed on a second viewing angle area 1412 adjacent to the first viewing angle area, which is highlighted on the viewing angle indicator 1410. The viewing angle indicator 1410 can highlight the second viewing angle area 1412. The second viewing angle area adjacent to the first viewing angle area may correspond to the second viewing angle 622 mentioned earlier in FIG. 6 (*b*).

As shown in FIG. 14 (*b*), the mobile terminal can display a second frame 1430*b* corresponding to the first viewing angle area and the second viewing angle area of the first time point of the multi-view video on the display unit. The mobile terminal can highlight a viewing angle 1412 corresponding to the second viewing angle area of the viewing angle indicator 1410.

The mobile terminal can sense a second input signal inputted on the angle indicator 1410. The second input signal 1422 corresponds to a drag touch input. Other commands may also be used. In this case, as shown in FIG. 14 (*c*), the mobile terminal can display a third frame 1430*c* corresponding to the first viewing angle area to a third viewing angle area of a first time point on the display unit. In this case, the third angle area may correspond to the third viewing angle 623 mentioned earlier in FIG. 6 (*b*). The mobile terminal can highlight viewing angles 1413 corresponding to the first to the third viewing angle area of the viewing angle indicator 1410.

In particular, a user can use frames corresponding to various viewing angle areas by operating the viewing angle indicator only instead of an input signal inputted on a frame itself via the aforementioned embodiments.

Although it is not depicted in FIG. 14, the first input signal inputted on the viewing angle indicator may correspond to a long-touch input or a long-press touch input. In this case, the mobile terminal can display a viewing angle indicator of a planar form of a hexahedron instead of the viewing angle indicator of a cube form. Yet, since a size of the viewing angle indicator of the planar form is small on the display unit, an input signal for changing the viewing angle indicator may not be correctly recognized. Thus, the mobile terminal can output the viewing angle indicator in a planar shape by enlarging and overlaying the planar viewing angle indicator on a frame in response to the first input signal. In this case, the enlarged viewing angle indicator is displayed for predetermined time. If an input signal of a user is not sensed within the predetermined time, the enlarged viewing angle indicator can be eliminated from the frame. In this case, a previously displayed frame is darkly displayed via a graphic effect to highlight the viewing angle indicator. By doing so, a user can easily perform an input for changing a viewing angle area using the enlarged viewing angle indicator.

Figure 15:
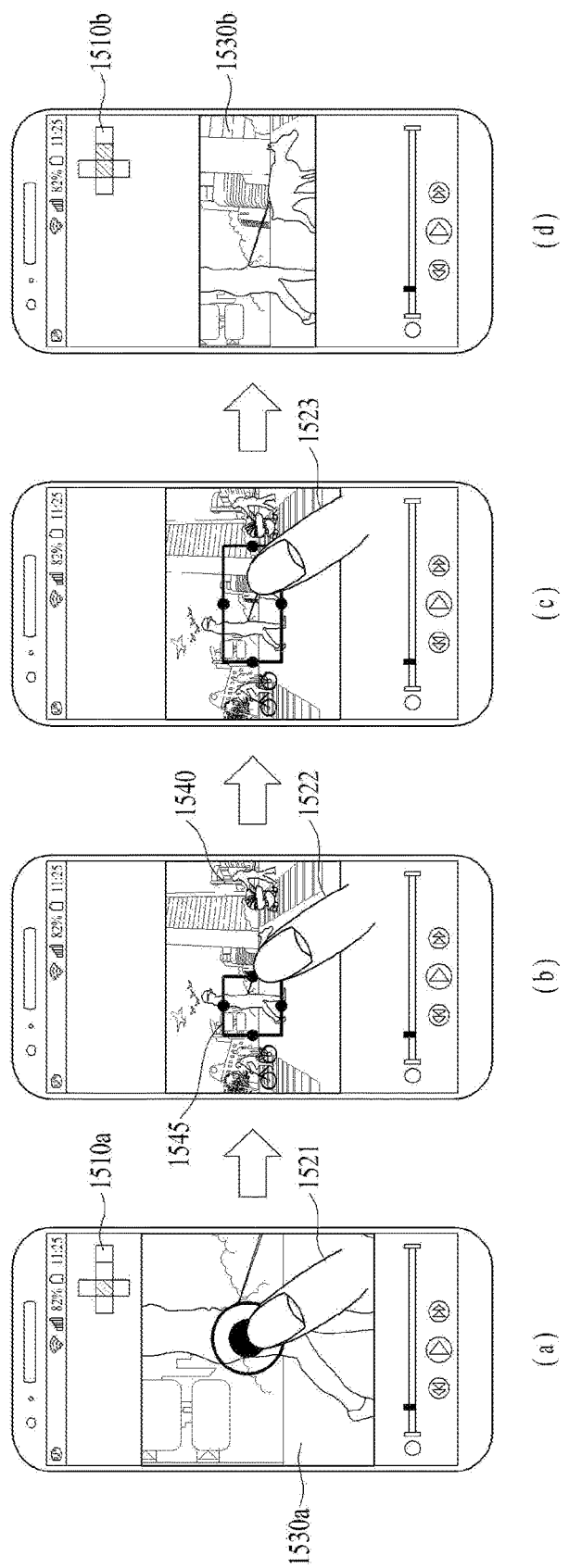
FIG. 15 is a diagram for an example of changing a playback viewing angle of a multi-view video displayed in a mobile terminal according to one embodiment of the present invention.

FIG. 15 is a diagram exemplifying changing a playback viewing angle of a multi-view video displayed in a mobile terminal according to one embodiment of the present invention.

Referring to FIG. 15 (*a*), the mobile terminal can display a first frame 1530*a* corresponding to a first viewing angle area of a first time point of a multi-view video on the display unit. The mobile terminal can display a viewing angle indicator 1510. In an embodiment of FIG. 15 (*a*), the mobile terminal can highlight an area corresponding to the first viewing angle area of the angle indicator 1510. In the embodiment of FIG. 15 (*a*), the first viewing angle area may correspond to the second viewing angle mentioned earlier in FIG. 6 (*a*).

The mobile terminal can sense a first input signal 1521 inputted on a first frame 1530*a*. In this case, the first input signal can correspond to a long-touch input or a long-press input. Other commands may also be used. In this case, the mobile terminal can enter a playback editing mode. Referring to FIG. 15 (*b*), the playback editing mode may correspond to a mode for displaying a frame 1540 of 360 degrees corresponding to the total angle areas of the first time point and editing a playback viewing angle according to an input signal of a user. In this case, the mobile terminal can display an editing indicator 1545.

Referring to FIG. 15 (*b*), the mobile terminal can sense a second input signal 1522 inputted on the editing indicator 1545. The second input signal corresponds to a drag touch input. Other commands may also be used. In this case, as shown in FIG. 15 (*c*), the mobile terminal can change an area on which the editing indicator 1545 is displayed on the frame 1540 of 360 degrees. In particular, a user can minutely determine a viewing angle area to be played by operating the editing indicator 1545.

Subsequently, the mobile terminal can sense a third input signal 1523 inputted on an area where the editing indicator 1545 is displayed. The third input signal may correspond to a short touch input. In this case, referring to FIG. 15 (*d*), the mobile terminal can display a second frame 1530*b* corresponding to the area on which the editing indicator 1545 is displayed among the frame 1540 of 360 degrees. The mobile terminal can highlight a viewing angle corresponding to the second frame 1530*b* of the viewing angle indicator.

In particular, a user can watch a video of a viewing angle area manually determined by the user instead of a predetermined viewing angle area via the aforementioned embodiments.

Figure 16:
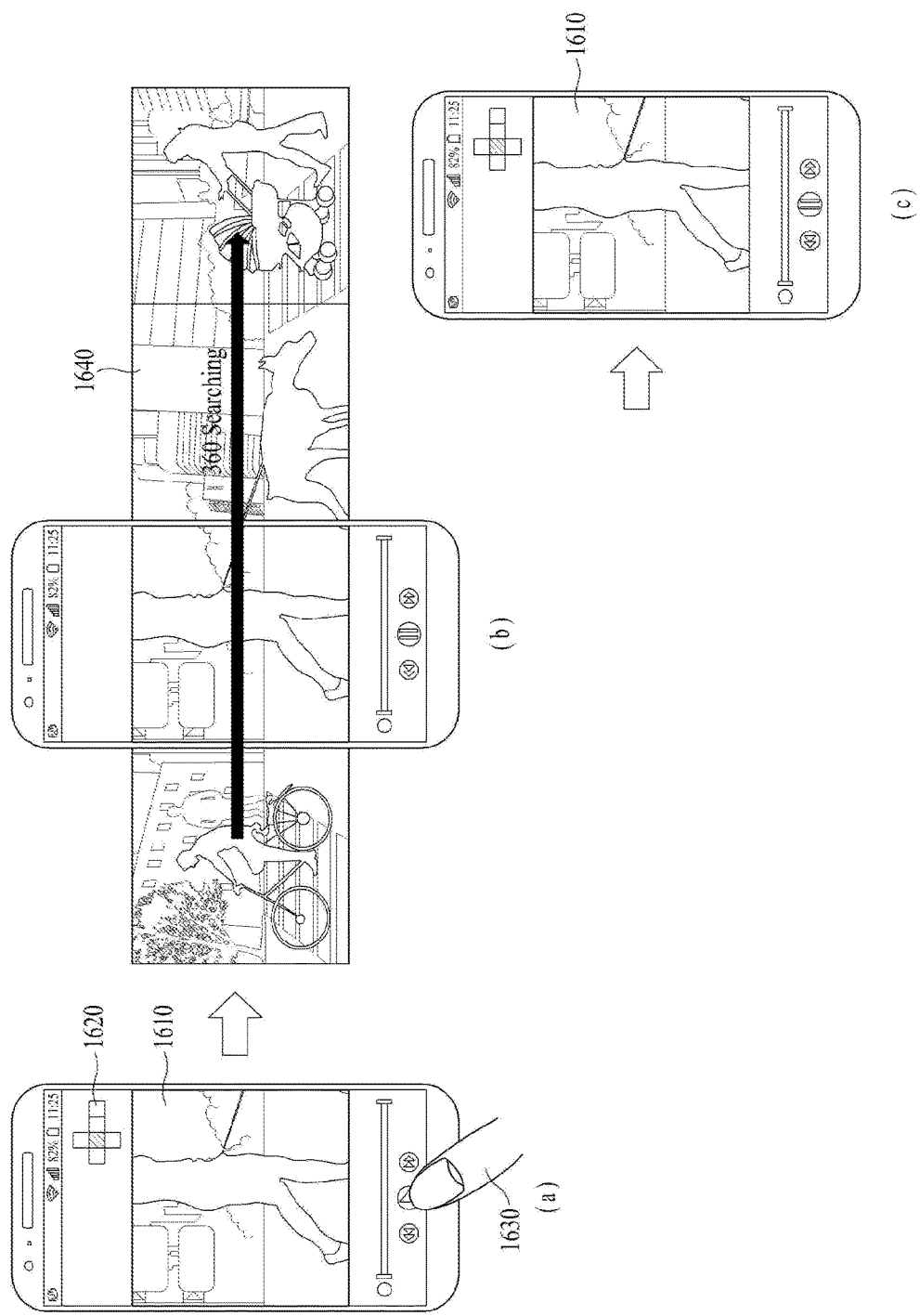
FIG. 16 is a diagram for an example of displaying the total playback viewing angle when a multi-view video displayed in a mobile terminal is played according to one embodiment of the present invention.

Searching for a Frame Corresponding to 360 Degrees when Multi-View Video is Played FIG. 16 is a diagram for an example of displaying the total playback viewing angle when a multi-view video displayed in a mobile terminal is played according to one embodiment of the present invention.

Referring to FIG. 16 (*a*), the mobile terminal can display a frame 1610 corresponding to a first viewing angle area of a first time point of a multi-view video on the display unit. For example, the first time point may correspond to a start point of the multi-view video. For example, the first viewing angle area may correspond to the second viewing angle mentioned earlier in FIG. 6 (*a*).

In this case, the mobile terminal can sense a first input signal 1620 inputted on a playback icon. For example, the first input signal 1620 can correspond to a short touch input. Other commands may also be used. The first input signal 1620 corresponds to a signal for playing the multi-view video. In this case, as shown in FIG. 16 (*b*), the mobile terminal can display frames of 360 degrees of the first time point in order. Although FIG. 16 (*b*) shows that the frames 1630 of 360 degrees are sequentially displayed on a display area according to a predetermined viewing angle area, the method is not limited to displaying all of the frames for the 360 degree view.

Subsequently, referring to FIG. 16 (*c*), if display of the frames of 360 degrees of the first time point is completed, the mobile terminal can play a video based on a first viewing angle area among the multi-view video on the display unit from the first time.

Although it is not depicted in FIG. 16, the mobile terminal can play the multi-view video in various ways according to a kind of an input signal inputted on a playback icon. For example, if a short touch input inputted on the playback icon is sensed, the mobile terminal displays all frames of 360 degrees corresponding to the first time point one time and may be then able to play a video of the first viewing angle area from the first time point. For example, if a long-touch input, a press touch input or the like is sensed on the playback icon, the mobile terminal may be able to immediately play the video of the first viewing angle area from the first time point without displaying the frames of 360 degrees. The reverse can also be performed.

Figure 17:
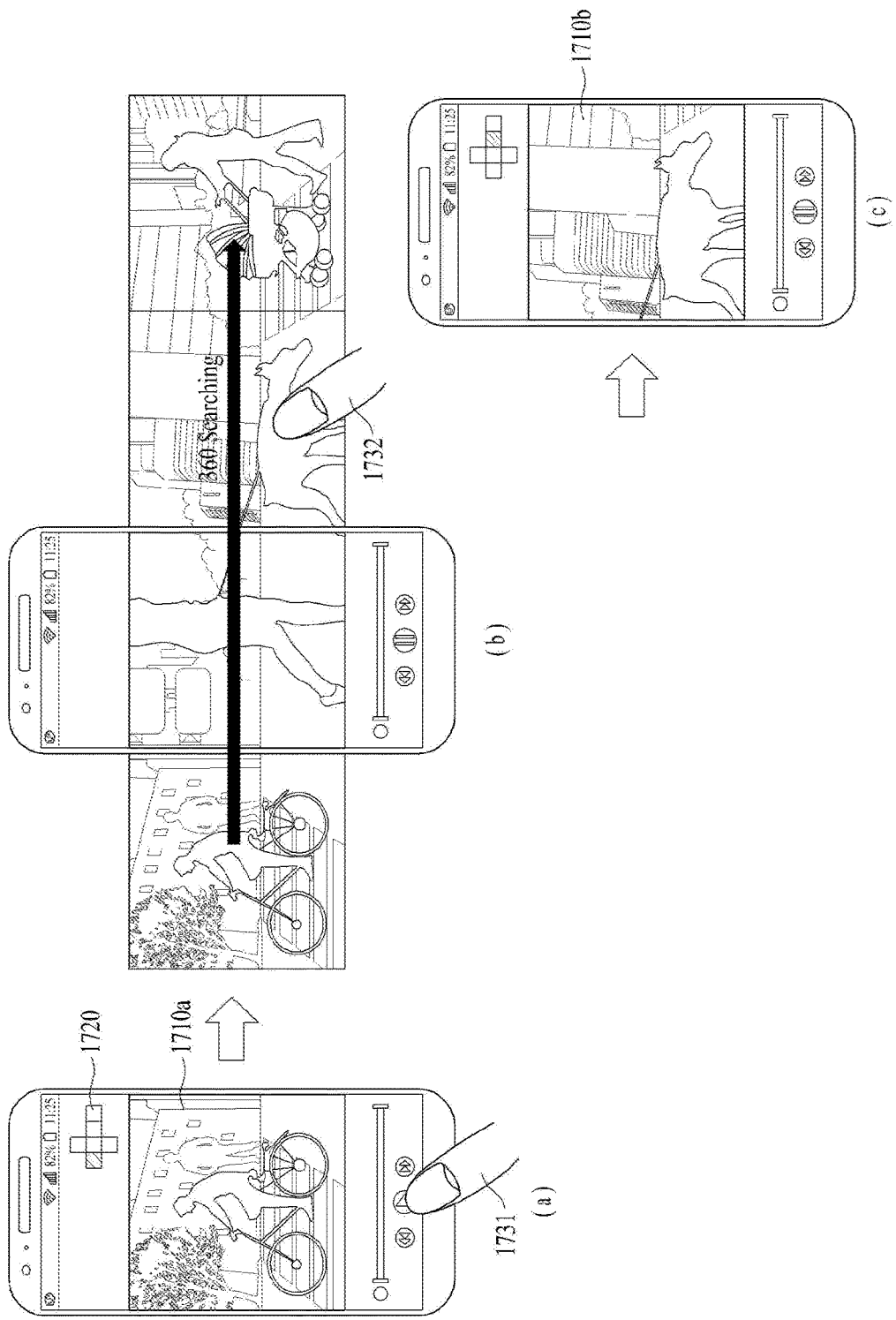
FIG. 17 is a diagram for an example of displaying the total playback viewing angle when a multi-view video displayed in a mobile terminal is played according to one embodiment of the present invention.

FIG. 17 is a diagram of an exemplary display of the total playback viewing angle when a multi-view video displayed in a mobile terminal is played according to one embodiment of the present invention. In an embodiment of FIG. 17, explanation on contents overlapped with the contents of FIG. 16 is omitted.

Referring to FIG. 17 (a), the mobile terminal can display a frame 1710a corresponding to a first viewing angle area of a first time point of a multi-view video on the display unit. For example, the first time point may correspond to a start point of the multi-view video or a random time determined by an input signal inputted by a user. For example, the first viewing angle area may correspond to the first viewing angle mentioned earlier in FIG. 6 (a).

In this case, the mobile terminal can sense a first input signal 1731 inputted on a playback icon. In this case, as shown in FIG. 17 (b), the mobile terminal can sequentially display frames of 360 degrees of the first time point according to a predetermined viewing angle area. Subsequently, the mobile terminal can sense a second input signal 1732 while the frames of 360 degrees are sequentially displayed. The second input signal 1732 can correspond to a short touch input. Other commands may also be used. The second input signal 1732 may correspond to a signal inputted on a second viewing angle area. For example, the second viewing angle area may correspond to the third viewing angle mentioned earlier in FIG. 6 (a).

In this case, as shown in FIG. 17 (c), after the display of the frames of 360 degrees corresponding to the first time point is completed, the mobile terminal can play a video corresponding to a frame 1710b on which the second input signal 1732 is sensed. In particular, the mobile terminal can play a video based on a third viewing angle area among the multi-view video from the first time point.

Figure 18:
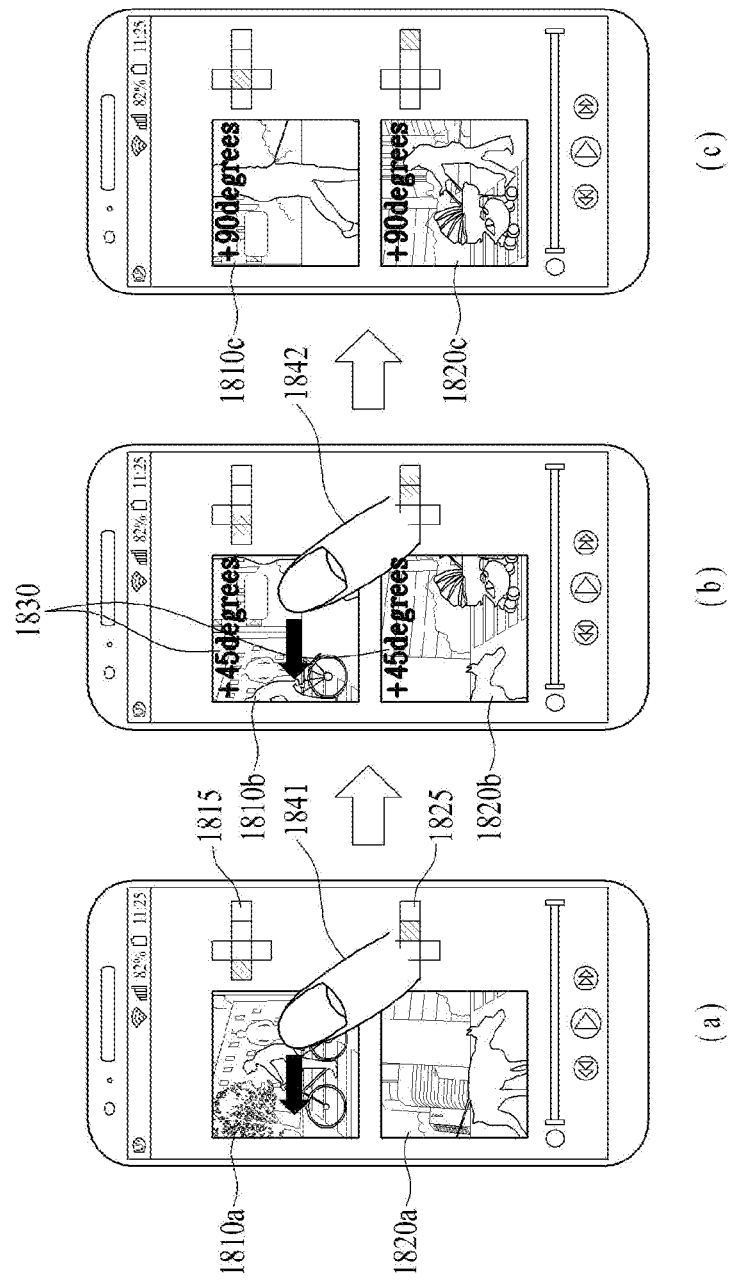
FIG. 18 is a diagram for an example of changing a playback viewing angle of a multi-view video displayed in a mobile terminal according to one embodiment of the present invention.

Changing Playback Viewing Angles in a State that a Plurality of Frames are Displayed FIG. 18 is a diagram exemplifying changing a playback viewing angle of a multi-view video displayed in a mobile terminal according to one embodiment of the present invention.

Referring to FIG. 18 (a), the mobile terminal can display a first frame 1810a and a second frame 1820a corresponding to a first time point of a multi-view video on the display unit. In this case, the first frame 1810 corresponds to a frame corresponding to a first viewing angle area of the first time point and the second frame 1820 corresponds to a frame corresponding to a second viewing angle area of the first time point. The mobile terminal can display a first angle indicator 1815 corresponding to the first viewing angle area and a second angle indicator 1825 corresponding to the second viewing angle area. In an embodiment of FIG. 18 (a), the first viewing angle area corresponds to the first viewing angle mentioned earlier in FIG. 6 (a) and the second viewing angle area corresponds to the third viewing angle mentioned earlier in FIG. 6 (a).

In this case, the mobile terminal can sense a first input signal 1841 inputted on the first frame 1810. For example, the first input signal 1841 can correspond to a drag touch input dragged in the left direction. Other commands may also be used. The first input signal 1841 may correspond to an input for moving a viewing angle area displayed on a frame to the right direction as much as 45 degrees.

As shown in FIG. 18 (b), the mobile terminal can display a third frame 1810b and a fourth frame 1820b in response to the first input signal 1841. In this case, the third frame 1810b may correspond to a frame of which the first frame 1810a rotates in the right direction as much as 45 degrees on the basis of a reference angle (direction) and the fourth frame 1820b may correspond to a frame of which the second frame 1820a rotates in the right direction as much as 45 degrees on the basis of a reference angle. For example, the reference angle can correspond to a reference angle used to measure the degrees for the 360 degree frames. The reference angle can be configured by a user or can be set to a captured video in advance. In particular, although an input signal is sensed on a single frame only among a plurality of frames, it is possible to change and display all of the frames.

As shown in FIG. 18 (b), the mobile terminal can display a viewing angle changing indicator 1830 on the third frame 1810b and the fourth frame 1820b. For example, the viewing angle changing indicator 1830 can be determined based on a length of the first input signal 1841. For example, the viewing angle changing indicator 1830 can be implemented in various forms including a number, a figure, a bar, etc. indicating a viewing angle. In an embodiment of FIG. 18 (b), the viewing angle changing indicator 1830 is implemented by a text indicating '+45 degrees' and may be able to indicate that a viewing angle changes as much as 45 degrees based on the first input signal 1841. In the present exemplary embodiment, the + direction corresponds to the right direction. In the embodiment of FIG. 18 (b), the mobile terminal can highlight a first viewing angle indicator 1815 and a second viewing angle indicator 1825 to indicate viewing angles corresponding to the third frame 1810b and the fourth frame 1820b, respectively.

The mobile terminal can sense a second input signal 1842 inputted on the third frame 1810b. For example, the second input signal 1842 corresponds to a drag touch input dragged in the left direction. Other commands may also be used. The second input signal 1842 may correspond to a signal for moving viewing angle areas displayed on the third frame 1810b and the fourth frame 1820b to the right direction as much as 45 degrees. In this case, the mobile terminal can display a fifth frame 1810c and a sixth frame 1820c in response to the second input signal 1842. The fifth frame 1810c may correspond to the first frame 1810a rotated in the right direction as much as 135 degrees based on a reference angle and the sixth frame 1820c may correspond to a frame of which the second frame 1820a rotates in the right direction as much as 135 degrees on the basis of a reference angle. Hence, in an embodiment of FIG. 18 (c), the mobile terminal can highlight the first viewing angle indicator 1815 and the second viewing angle indicator 1825 to indicate viewing angles corresponding to the fifth frame 1810c and the sixth frame 1820c, respectively.

Referring to FIG. 18 (c), the viewing angle changing indicator 1830 can be outputted on the fifth frame 1810c and the sixth frame 1820c, respectively. In the embodiment of FIG. 18 (c), the viewing angle changing indicator 1830 is implemented by a text indicating '+90 degrees' and may be able to indicate that the total viewing angle area has moved as much as 90 degrees based on the first input signal and the second input signal.

Figure 19:
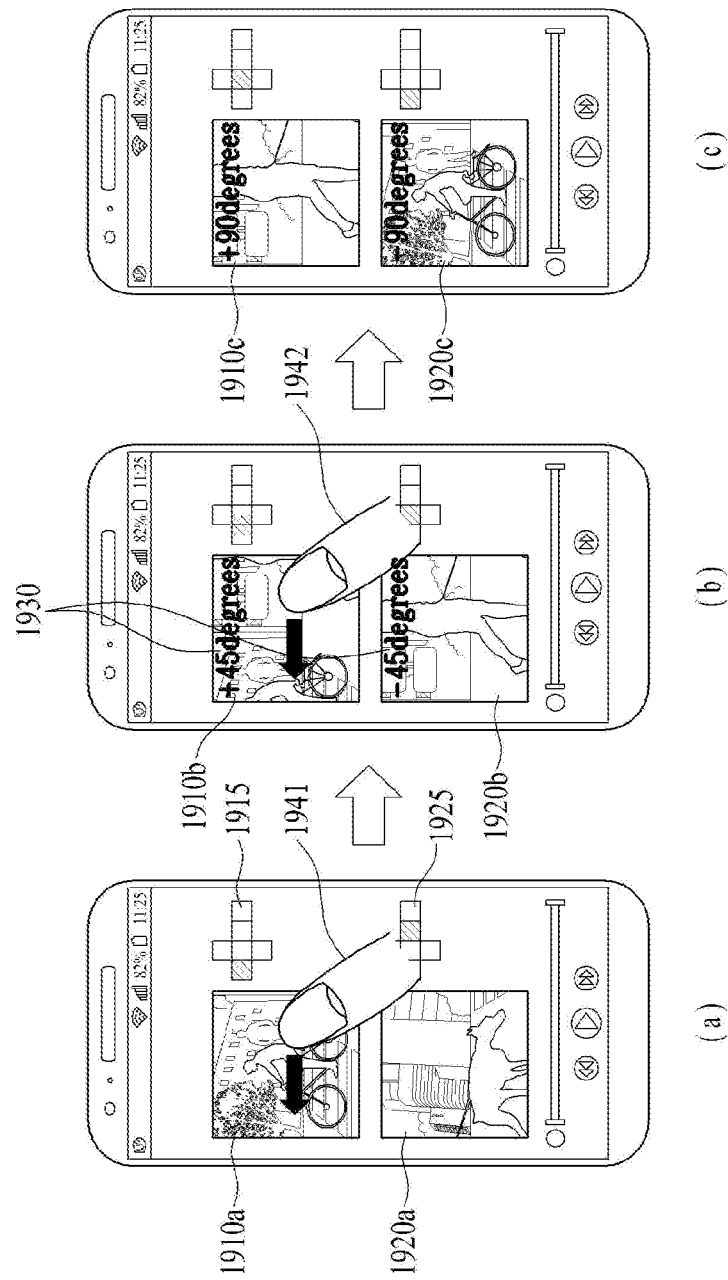
FIG. 19 is a diagram for an example of changing a playback viewing angle of a multi-view video displayed in a mobile terminal according to one embodiment of the present invention.

FIG. 19 is a diagram exemplifying changing a playback viewing angle of a multi-view video displayed in a mobile terminal according to one embodiment of the present invention. In an embodiment of FIG. 19, explanation on contents overlapped with the contents of FIG. 18 is omitted.

Referring to FIG. 19 (a), the mobile terminal can display a first frame 1910a and a second frame 1920a corresponding to a first time point of a multi-view video on the display unit. In this case, assume that the first frame 1910a and the second frame 1920a are identical to the contents mentioned earlier in FIG. 18 (a). A first viewing angle indicator 1915 and a second viewing angle indicator 1925 can be identical to the contents mentioned earlier in FIG. 18 (a).

In this case, the mobile terminal can sense a first input signal 1941 inputted on the first frame 1910a. As shown in FIG. 19 (b), the mobile terminal can display a third frame 1910b and a fourth frame 1920b in response to the first input signal 1941. The third frame 1910b may correspond to the first frame 1910a rotated in the right direction as much as 45 degrees based on a reference direction and the fourth frame 1920b may correspond to the second frame 1920a rotated in the left direction as much as 45 degrees based on a reference angle. In particular, in the embodiment of FIG. 19, when a plurality of frames are displayed, if an input signal inputted on a frame is sensed, the mobile terminal can move each of a plurality of the frames in different direction and display a plurality of the frames.

As shown in FIG. 19 (b), the mobile terminal can display a viewing angle changing indicator 1930 on the third frame 1910b and the fourth frame 1920b. In an embodiment of FIG. 19 (b), the viewing angle changing indicator 1930 outputted on the third frame 1910b is implemented by a text indicating '+45 degrees' and the viewing angle changing indicator 1930 outputted on the fourth frame 1920b is implemented by a text indicating '−45 degrees'. In the embodiment of FIG. 19 (b), the mobile terminal can highlight a first viewing angle indicator 1915 and a second viewing angle indicator 1925 to indicate angles corresponding to the third frame 1910b and the fourth frame 1920b, respectively.

The mobile terminal can sense a second input signal 1942 inputted on the third frame 1910b. In this case, as shown in FIG. 19 (c), the mobile terminal can display a fifth frame 1910c and a sixth frame 1920c in response to the second input signal 1942. The fifth frame 1910c may correspond to the first frame 1910a rotated in the right direction as much as 90 degrees based on a reference angle and the sixth frame 1920c may correspond to the second frame 1920a rotated in the left direction as much as 90 degrees based on a reference angle. In an embodiment of FIG. 19 (c), the mobile terminal can highlight the first viewing angle indicator 1915 and the second viewing angle indicator 1925 to indicate viewing angles corresponding to the fifth frame 1910c and the sixth frame 1920c, respectively.

As shown in FIG. 19 (c), the mobile terminal can display a viewing angle changing indicator 1930 on the fifth frame 1910c and the sixth frame 1920c. In an embodiment of FIG. 19 (c), the viewing angle changing indicator 1930 outputted on the fifth frame 1910c is implemented by a text indicating '+90 degrees' and the viewing angle changing indicator 1930 outputted on the sixth frame 1920c is implemented by a text indicating '−90 degrees'.

Although the embodiments of FIG. 18 and FIG. 19 explain an event where an input signal is sensed on a frame positioned at the top among a plurality of frames including a partial viewing angle area among 360 degrees, the embodiments can also be equally applied to a frame positioned at the bottom. Although the embodiments of FIG. 18 and FIG. 19 exemplify a case where an input signal is sensed in a state of displaying two frames at the same time, the embodiments can also be equally applied to a display of a single frame or three or more frames at the same time.

Search for Object in the Middle of Playing Multi-View Video.

Figure 20:
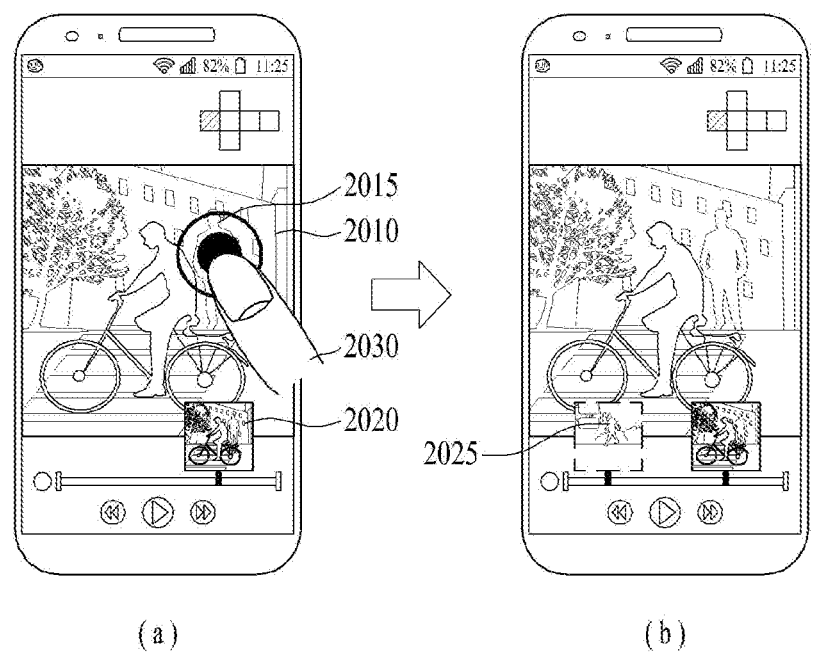
FIG. 20 is a diagram for an example of searching for an object included in a multi-view video displayed in a mobile terminal according to one embodiment of the present invention.

FIG. 20 is a diagram exemplifying searching for an object included in a multi-view video displayed in a mobile terminal according to one embodiment of the present invention.

A user may want to check whether an object or a person included in a frame is captured in a different viewing angle or at a different time point of the multi-view video either while the video is playing or where the video is stopped. Although an embodiment of FIG. 20 explains a method of searching for an object where the playback is stopped, the embodiment can also be applied when searching for an object while playing the video.

Referring to FIG. 20 (a), the mobile terminal can display a first frame 2010 corresponding to a first viewing angle area of a first time point of a multi-view video on the display unit. The mobile terminal can display a progress bar and a first thumbnail image 2020 corresponding to the first frame 2010 on the display unit. In this case, the first frame can include at least one or more objects. For example, an object can include a thing, a person and the like. In an embodiment of FIG. 20 (a), the first frame 2010 includes such an object as a person riding a bicycle, a person standing at a crosswalk, a tree and the like.

The mobile terminal can sense an input signal 2030 inputted on an object 2015 included in the first frame 2020. The input signal can correspond to a long touch input or a long-press touch input. Other commands may also be used. The input signal 2030 may correspond to a signal for searching for the object in the whole multi-view video.

As shown in FIG. 20 (b), the mobile terminal can display a second thumbnail image 2025 on the progress bar. The second thumbnail image 2025 may correspond to an image indicating a second frame corresponding to a second viewing angle area of a second time point. The second thumbnail image 2025 may indicate the time point at which the object 2015 is captured and a frame corresponding to a viewing angle area in the multi-view video. Unlike the first thumbnail image 2020, the second thumbnail image 2025 indicates a search result of a specific object and may have shape different than that of the first thumbnail image 2020. Although it is not depicted in FIG. 20 (b), a viewing angle area of a frame corresponding to the second thumbnail may appear in text form.

In the embodiment of FIG. 20, as a result of searching for the object 2015, a single thumbnail image 2025 is displayed only. Yet, it may be possible to display a plurality of thumbnail images of the same time. A user can easily determine time point and angle at which a person or an object included in a current viewing angle area of a current time point is additionally captured via the embodiment of FIG. 20.

Searching for Object in the Middle of Playing Multi-View Video.

Figure 23:
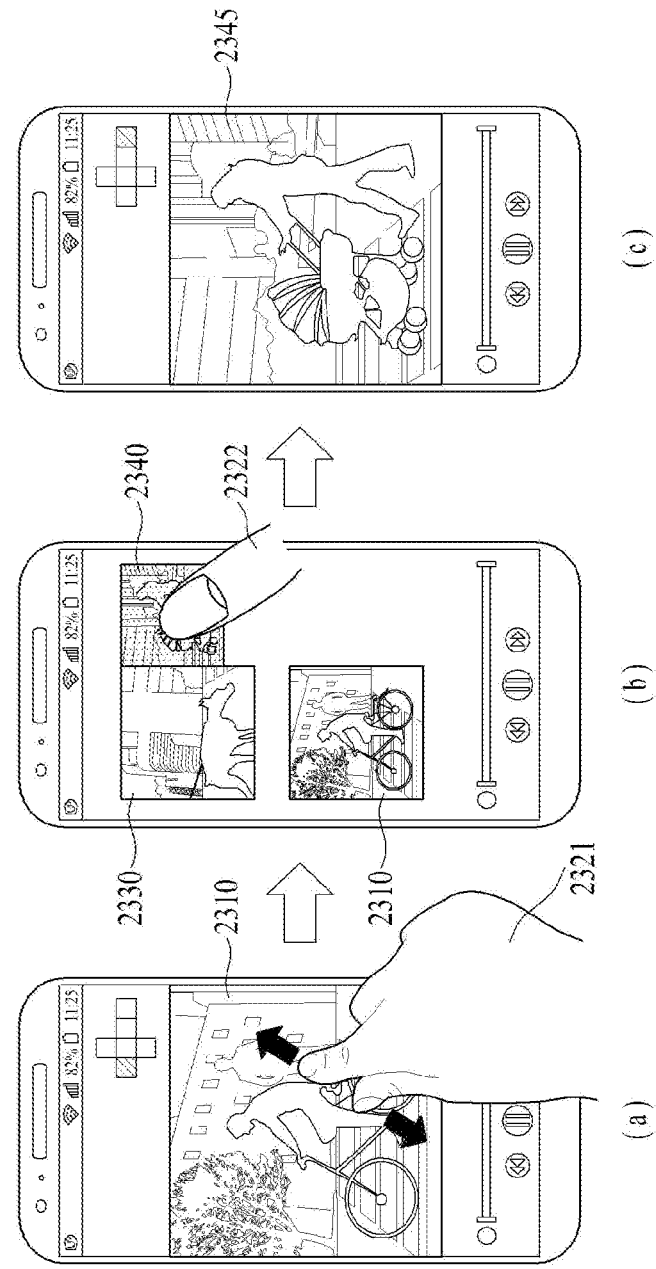
FIG. 23 is a diagram for an example of automatically searching for a movement of an object in the middle of playing a multi-view video displayed in a mobile terminal according to one embodiment of the present invention.
Figure 24:
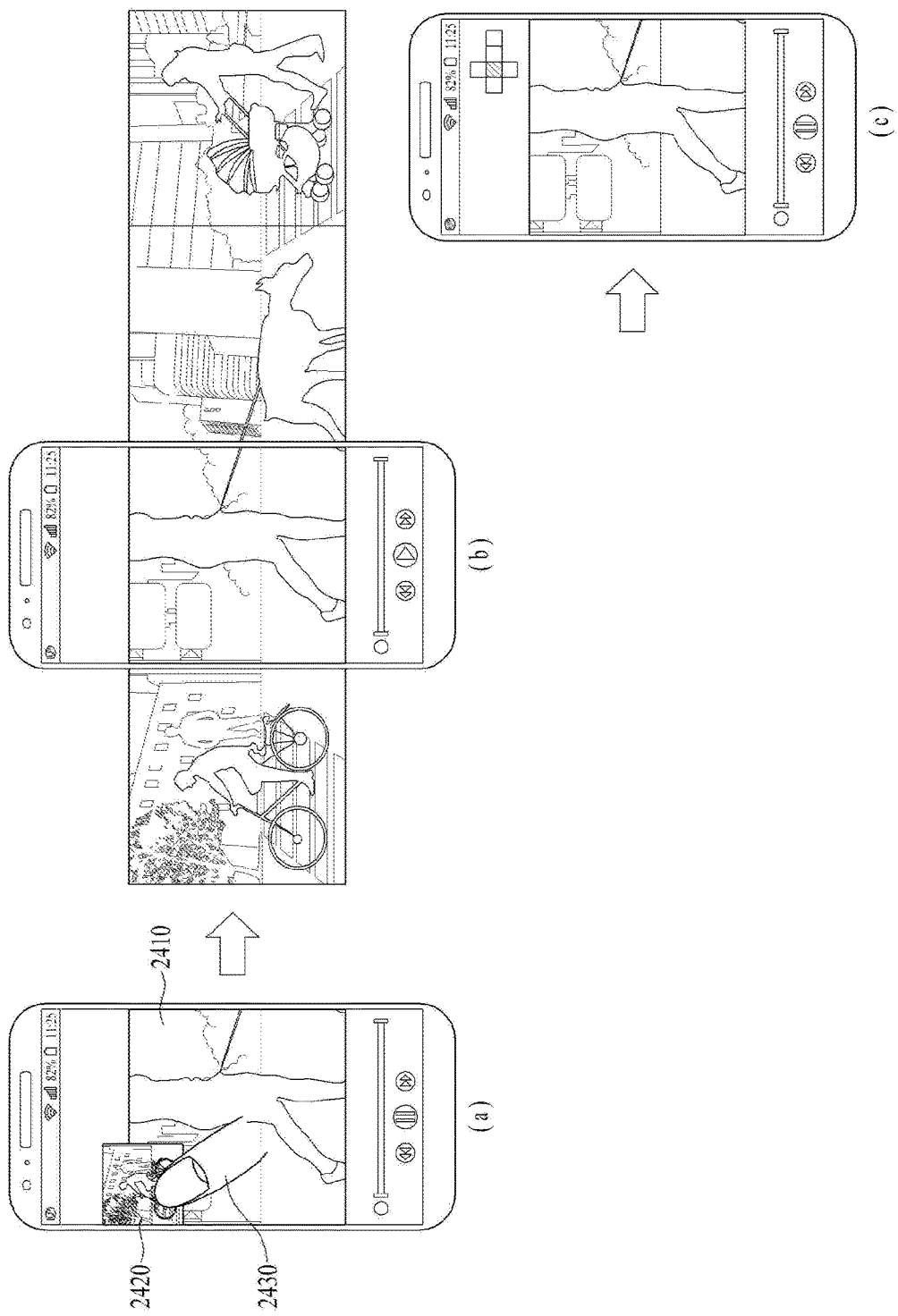
FIG. 24 is a diagram for an example of automatically searching for a movement of an object in the middle of playing a multi-view video displayed in a mobile terminal according to one embodiment of the present invention.

If a movement of an object is sensed at a different viewing angle area rather than a currently displayed viewing angle area while playing a multi-view video, the mobile terminal can notify a user of the movement via an indicator. In the following, when a movement of an object is recognized while playing a multi-view video, FIGS. 21 and 22 show a method of manually searching for an object and FIGS. 23 and 24 show a method of automatically searching for an object.

Figure 21:
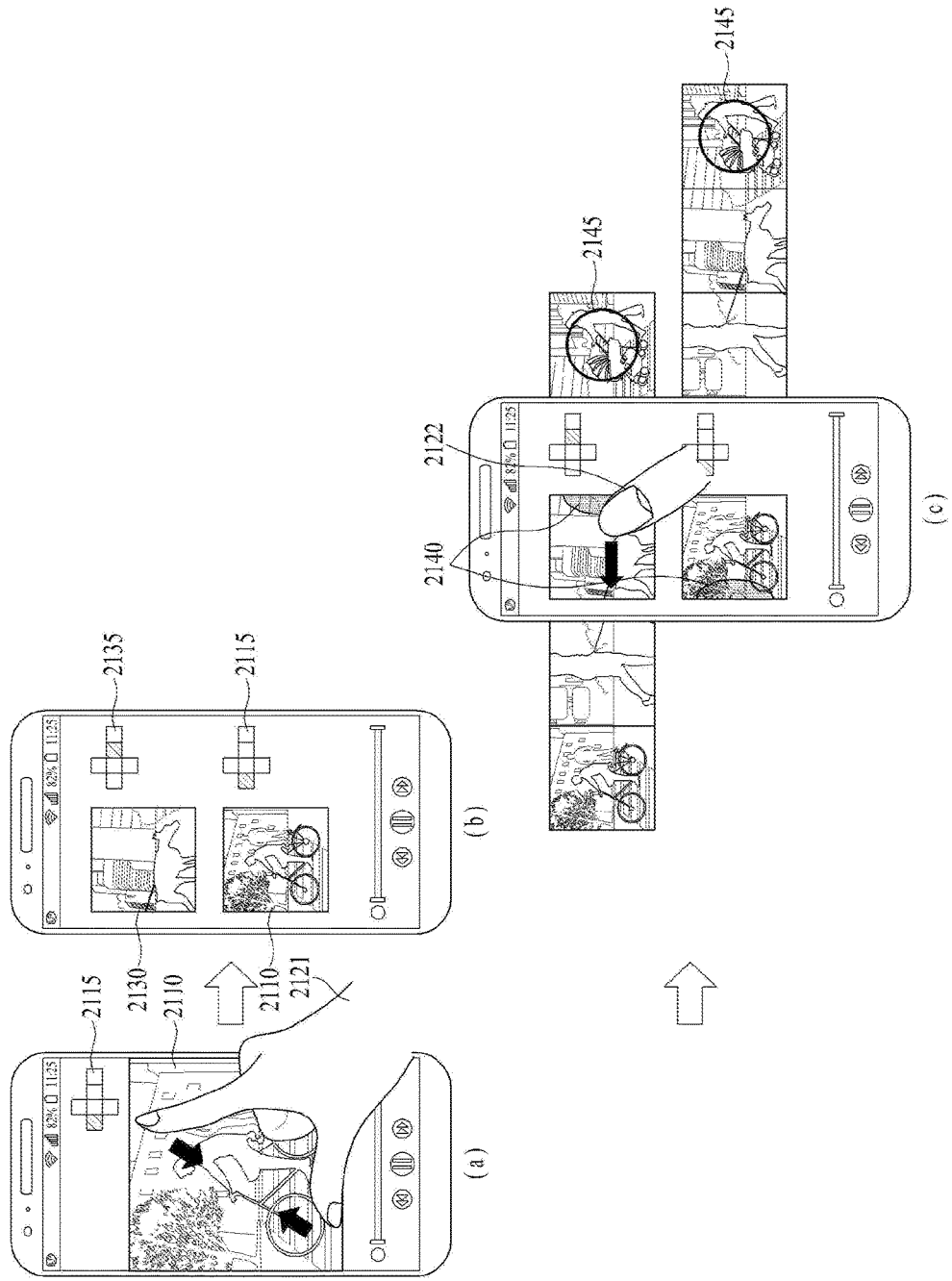
FIGS. 21 and 22 are diagrams for an example of manually searching for a movement of an object in the middle of playing a multi-view video displayed in a mobile terminal according to one embodiment of the present invention.
Figure 22:
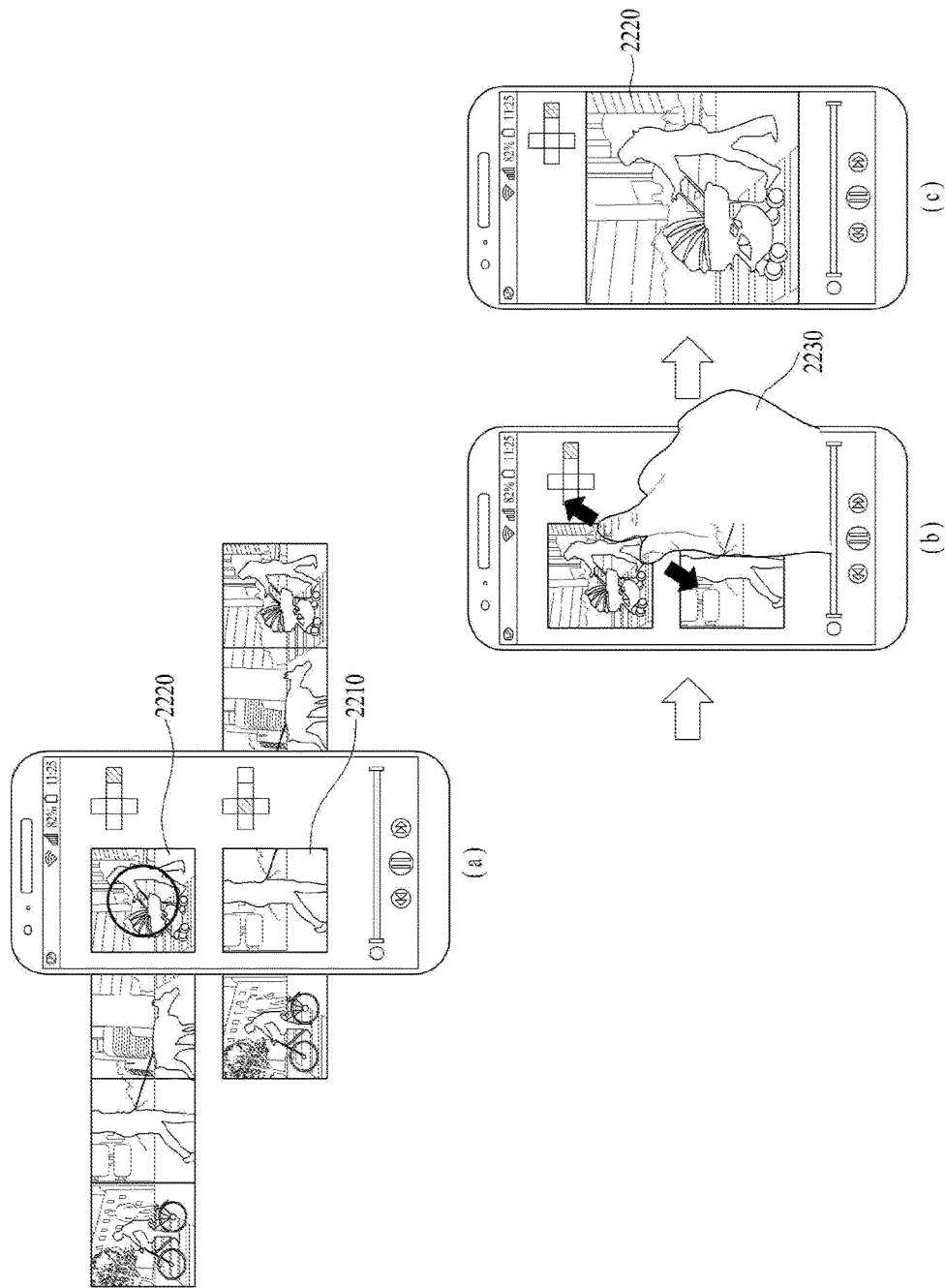

FIGS. 21 and 22 are diagrams for an example of manually searching for a movement of an object while playing a multi-view video displayed in a mobile terminal according to one embodiment of the present invention.

Referring to FIG. 21 (a), the mobile terminal can play a first video 2110 corresponding to a first viewing angle area of a first time point of a multi-view video on the display unit. The mobile terminal can highlight an area of an angle indicator 2115 corresponding to the first viewing angle area. For example, in an embodiment of FIG. 21 (a), the first viewing angle area may correspond to the first viewing angle mentioned earlier in FIG. 6 (a).

The mobile terminal can sense a first input signal 2121 inputted on the first video 2110 at the first time point while playing the multi-view video. The first input signal 2121 corresponds to a pinch-in touch input. Other commands may also be used. In this case, as shown in FIG. 21 (b), the mobile terminal can additionally play a second video 2130. In particular, the mobile terminal can play the first video 2110 and the second video 2130 at the same time in response to the first input signal 2121. While time of the second video 2130 and time of the first video are identical to each other, the second video may correspond to a video corresponding to a second viewing angle area. For example, in an embodiment of FIG. 21 (b), the second viewing angle area may correspond to the third viewing angle area mentioned earlier in FIG. 6 (a). By doing so, a user can use the multi-view video in various viewing angles at the same time.

As shown in FIG. 21 (c), the mobile terminal can recognize or sense a movement of an object while playing a multi-view video. In this case, the object can include a thing, a person and the like. In an embodiment of FIG. 21 (c), an object of which a movement is sensed may correspond to a person moving a stroller. In this case, the mobile terminal can display a movement indicator 2140 on one side of the first video and the second video. The movement indicator can be displayed at a direction relative to a direction at which an object is recognized on the basis of each video. For example, in the embodiment of FIG. 21 (c), the mobile terminal can determine as an object 2145 is recognized at the left in case of the first video 2110. In the embodiment of FIG. 21 (c), the mobile terminal can determine the object 2145 is recognized at the right in case of the second video 2130. In this case, a user watching the multi-view video may want to check the object 2145.

In relation to this, referring to FIG. 21 (c), the mobile terminal can sense a second input signal 2122 inputted on the second video 2130. The second input signal 2122 corresponds to a drag touch input dragged in the left direction. Other commands may also be used. The second input signal 2122 can correspond to a user input for checking a moving object 2145 and may correspond to an input for displaying a viewing angle area positioned at the right of the second video 2130. Although FIG. 21 (c) shows that the second input signal 2122 is sensed on the second video 2130, the second input signal can be sensed on the first video 2110 as well. In this case, the second input signal 2122 may correspond to a drag touch input dragged in the right direction on the first video 2110.

Subsequently, referring to FIG. 22 (a), the mobile terminal can play a third video 2210 and a fourth video 2220 in response to the second input signal 2122. In this case, while time of the third video 2210 and time of the first video 2110 are identical to each other, the third video corresponds to a video captured at a third viewing angle area. While time of the fourth video 2220 and time of the second video 2120 are identical to each other, the fourth video corresponds to a video captured at a fourth viewing angle area. In an embodiment of FIG. 22 (a), the third viewing angle area may correspond to the second angle mentioned earlier in FIG. 6 (a) and the fourth viewing angle area may correspond to the fourth viewing angle mentioned earlier in FIG. 6 (a). In particular, as shown in FIG. 22 (a), a user can use a multi-view video captured at a different viewing angle area and check an object of which a movement is recognized via a drag touch.

Referring to FIG. 22 (b), the mobile terminal can sense a third input signal 2230 inputted on the fourth video 2220. The third input signal 2230 corresponds to a pinch-out touch input. Other commands may also be used. In this case, as shown in FIG. 22 (c), the mobile terminal can play the fourth video 2220 on which the third input signal 2230 is sensed in a manner of enlarging the fourth video 2220. In particular, when a plurality of videos corresponding to a plurality of viewing angle areas are played at the same time, if an input signal inputted on a specific video is sensed, the mobile terminal can play the video on which the input signal is sensed only in a manner of enlarging the video.

Meanwhile, unlike the aforementioned embodiment, the mobile terminal can also display the movement indicator in the middle of playing the first video only.

FIG. 23 is a diagram exemplifying how to automatically search for a movement of an object while playing a multi-view video displayed in a mobile terminal according to one embodiment of the present invention.

Referring to FIG. 23 (a), the mobile terminal can play a first video 2310 correspondent to a first angle area of a first time of a multi-view video. In this case, the mobile terminal can sense a first input signal 2321 inputted on the first video 2310. In this case, the first input signal 2321 corresponds to a pinch-out touch input. Other commands may also be used.

As shown in FIG. 23 (b), the mobile terminal can play the first video 2310 and a second video 2330 at the same time. In this case, since the second video 2330 is identical to the second video mentioned earlier in FIG. 21, explanation on the second video is omitted at this time. The mobile terminal can sense a movement of an object at a different viewing angle area corresponding to an identical time in the middle of playing video. As shown in FIG. 23 (b), it may be possible to display a movement thumbnail 2340 on a part of the display unit. In this case, the movement thumbnail 2340 may correspond to a thumbnail image indicating an object for which movement is recognized at a different viewing angle area rather than the viewing angle areas corresponding to the first video 2310 and the second video 2330.

The mobile terminal can sense a second input signal 2332 inputted on the movement thumbnail 2340. The second input signal 2322 corresponds to a short touch input. Other commands may also be used. In this case, as shown in FIG. 23 (c), the mobile terminal can play a third video 2345 indicating a viewing angle area corresponding to the movement thumbnail 2340 in response to the second input signal 2322. The third video 2345 may correspond to a video in which a different viewing angle area is captured, although the video, the first video 2310 and the second video 2330 are captured at the same time.

Unlike the aforementioned embodiment, the mobile terminal can display a movement indicator in the middle of playing the first video only. FIG. 24 is a diagram exemplifying how to automatically search for a movement of an object while playing a multi-view video displayed in a mobile terminal according to one embodiment of the present invention.

Referring to FIG. 24 (*a*), the mobile terminal can play a first video 2410 correspondent to a first viewing angle area of a multi-view video on the display unit. In this case, the mobile terminal can recognize a movement of an object at a different viewing angle area rather than the first viewing angle area of the multi-view video. As shown in FIG. 24 (*a*), the mobile terminal can display a thumbnail 2420 of the viewing angle area including the object of which movement is recognized.

A user may want to check the object of which the movement is recognized while using the first video. In this case, the mobile terminal can sense an input signal 2430 inputted on the thumbnail 2420. The input signal 2430 may correspond to a short touch input. As shown in FIG. 24 (*b*), the mobile terminal stops playing the first video 2410 in response to the input signal 2430 and then may be to display all frames corresponding to 360 degrees matched with the time point of which the first video 2410 is stopped. By doing so, a user can directly check the viewing angle area at which the object of which movement is sensed is positioned.

As shown in FIG. 24 (*c*), after the frames of 360 degrees are displayed, the mobile terminal can play the first video again from the time on which the first video is stopped.

Although the embodiment of FIG. 24 explains an embodiment of displaying the frames of 360 degrees in case of sensing the input signal inputted on the thumbnail 2420, if a movement is sensed in a different viewing angle area, which is not displayed, while playing a multi-view video, playback of the video is automatically stopped and the mobile terminal can display the frames of 360 degrees. In this case, if an input signal inputted on a specific angle area by a user is sensed while displaying the frames of 360 degrees, the mobile terminal can play a video of the viewing angle area on which the input signal is sensed after the display of the frames of 360 degrees is completed.

Preview of Multi-View Video in Gallery.

Figure 25:
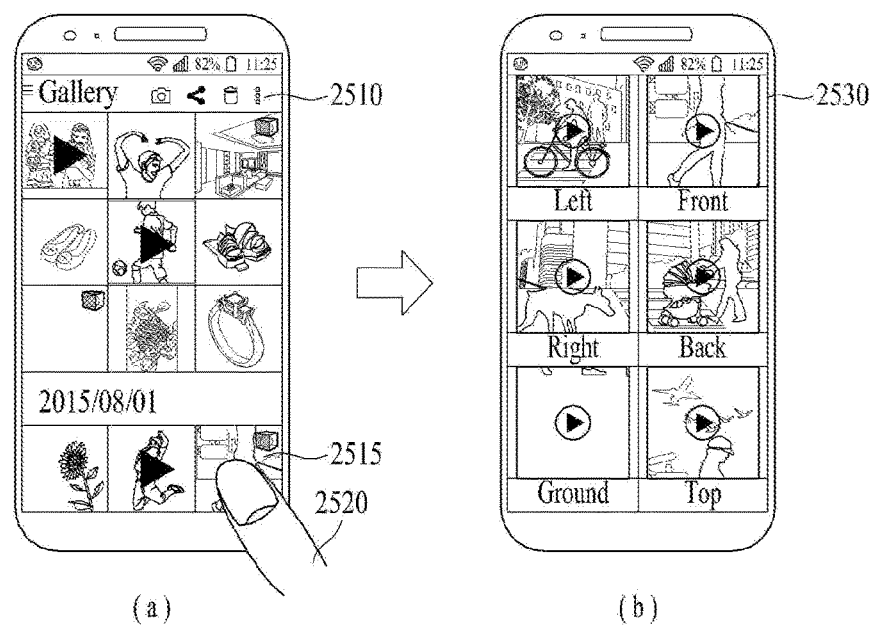
FIG. 25 is a diagram for an example of providing a preview in a gallery including a multi-view video displayed in a mobile terminal according to one embodiment of the present invention.

FIG. 25 is a diagram exemplifying how to provide a preview of a gallery including a multi-view video displayed in a mobile terminal according to one embodiment of the present invention.

Referring to FIG. 25 (*a*), the mobile terminal can display captured images, videos, and a thumbnail corresponding to a multi-view video at the same time on a gallery 2510. The gallery 2510 may correspond to an application for storing previously taken or captured images, videos and the like. The captured images and the videos can be stored in such an internal storage such as a memory of the mobile terminal or such an external storage as a cloud and the like. The mobile terminal can sense an input signal 2520 inputted on a thumbnail image 2515 for a displayed multi-view video. Although it is not depicted in FIG. 25, various indicators for distinguishing the captured images, the videos and the multi-view video displayed in the gallery from each other can be outputted together with the thumbnail image.

In this case, the mobile terminal can display thumbnails of videos corresponding to a plurality of viewing angle areas included in the multi-view video at the same time. For example, in an embodiment of FIG. 25 (*b*), the thumbnails of a plurality of the viewing angle areas included in the multi-view video may correspond to videos of viewing angle areas corresponding to a left, a front, a right, a back, and a ground side.

Although it is not depicted in FIG. 25, if an input signal inputted on a thumbnail indicating a viewing angle area is sensed, the mobile terminal can play a video corresponding to the angle viewing area with a preview. If an input signal inputted on a thumbnail indicating a viewing angle area is sensed, the mobile terminal can play a video corresponding to the angle area by a full-frame instead of a thumbnail size.

Although it is not depicted in FIG. 25, in an embodiment of FIG. 25 (*a*), the mobile terminal can sense a tilt input of the mobile terminal via a sensing unit. In this case, the tilt input may correspond to a viewing angle tilted to the right, the left, the top or the bottom side of the mobile terminal on the basis of a predetermined angle of the mobile terminal. For example, the predetermined angle may correspond to an angle horizontal to the horizontal plane or an angle vertical to the horizontal plane. In this case, the mobile terminal can display a preview of a viewing angle area corresponding to a tilt angle on a thumbnail image of a multi-view video displayed in the gallery. For example, the tilt angle may correspond to an angle that the right side of the mobile terminal is tilted as much as 30 degrees on the basis of the horizontal plane. In this case, the mobile terminal can display a preview of a video of a viewing angle area corresponding to the right side on a thumbnail image of a multi-view video. Meanwhile, in case of the present embodiment, if the mobile terminal senses a tilt input and a touch input at the same time, it may be able to provide a user with the aforementioned preview.

Figure 26:
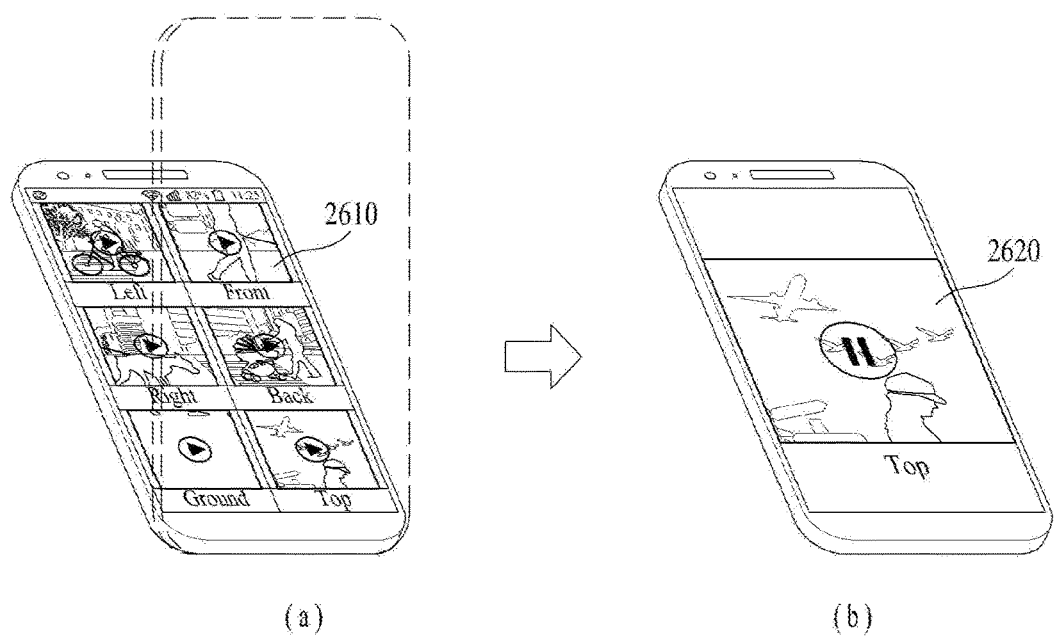
FIG. 26 is a diagram for an example of providing a preview in a gallery including a multi-view video displayed in a mobile terminal according to one embodiment of the present invention.

FIG. 26 is a diagram exemplifying how to provide a preview in a gallery including a multi-view video displayed in a mobile terminal according to one embodiment of the present invention.

Referring to FIG. 26 (*a*), the mobile terminal can display thumbnails of videos corresponding to a plurality of viewing angle areas included in a multi-view video at the same time. In an embodiment of FIG. 26, assume that a plurality of the viewing angle areas correspond to 6 viewing angle areas shown in FIG. 6 (*a*). In this case, the mobile terminal can sense an input signal. As an example, the input signal may correspond to a tilt input. The tilt input may correspond to an angle tilted to the right, the left, the top, and the bottom side of the mobile terminal on the basis of a predetermined angle of the mobile terminal. For example, the predetermined angle may correspond to an angle horizontal to the horizontal plane, an angle vertical to the horizontal plane or the like. In the embodiment of FIG. 26 (*a*), the tilt input may correspond to an angle that the top of the mobile terminal is tilted to the ground while the mobile terminal is horizontal to the horizontal plane. In this case, the mobile terminal can output a preview of a viewing angle area corresponding to the tilt input in a manner of enlarging the preview. In the embodiment of FIG. 26 (*b*), the viewing angle area corresponding to the tilt input may correspond to an angle corresponding to a top part among frames of 360 degrees. Hence, the mobile terminal can provide a preview of the viewing angle area corresponding to the top part in a manner of enlarging the preview.

Meanwhile, although it is not depicted in FIG. 26, the mobile terminal can provide a user with a preview of a thumbnail of a viewing angle area corresponding to a tilt input only in response to an input signal in a state that thumbnails of videos corresponding to a plurality of angle areas are displayed.

FIG. 27 is a flowchart for a method of controlling a mobile terminal according to one embodiment of the present invention. Each step of FIG. 27 described in the following can be controlled by the controller 180 of the mobile terminal shown in FIG. 1a.

The mobile terminal can display a frame corresponding to a first viewing angle area of a first time point of a multi-view video and a progress bar corresponding to the multi-view video [S2710].

The mobile terminal can sense a first input signal inputted on the progress. bar [S2720]. In this case, as mentioned earlier in FIG. 5, the first input signal may correspond to an input for moving a time indicator displayed on the progress bar.

In this case, the mobile terminal moves the time indicator displayed on a position corresponding to a first time point to a position corresponding to a second time point and may then be able to display a first thumbnail image corresponding to a first viewing angle area on the progress bar [S2730].

Subsequently, the mobile terminal can sense a second input signal inputted on the first thumbnail image [S2740]. In this case, the second input signal may correspond to an input for changing the viewing angle area shown in the first thumbnail image.

In this case, the mobile terminal can display a second thumbnail image corresponding to a second viewing angle area of the second time point [S2750].

Subsequently, the mobile terminal can sense a third input signal inputted on the second thumbnail image [S2760]. In this case, the third input signal may correspond to an input for determining and selecting the second thumbnail image.

In this case, the mobile terminal can display a frame corresponding to the second viewing angle area of the second time point on the display unit [S2770].

According to at least one or more embodiments of the present invention, a user can easily control and use a playback time and a playback angle of a multi-view video in which 360 degrees are captured.

According to at least one or more embodiments of the present invention, a user can easily recognize an event occurred at a different viewing angle area while using a video for a prescribed viewing angle area among a multi-view video.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a touchscreen;
and
a controller that controls the touchscreen to:
display a first frame corresponding to a first playback angle at a first playback time point of a multi-view video and a progress bar corresponding to the multi-view video,
in response to a touch input applied to the progress bar, move a time indicator displayed at a first position corresponding to the first playback time point to a second position corresponding to a second playback time point of the progress bar,
display a first thumbnail image corresponding to the first playback angle at the second playback time point while maintaining displaying the first frame, as the time indicator is moved from the first position to the second position,
in response to a touch input applied to the first thumbnail, change the first thumbnail image into a second thumbnail image to indicate that the first playback angle is increased to a second playback angle at the second playback time point, and
in response to a touch input applied to the second thumbnail image, replace the first frame with a different frame of the multi-view video and display the replaced first frame, the different frame corresponding to the second playback angle indicated by the second thumbnail image at the second playback time.

2. The mobile terminal of claim 1, wherein the controller further controls the touchscreen to display a thumbnail editing indicator on the first thumbnail image.

3. The mobile terminal of claim 1, wherein the controller further controls the touchscreen to display a third thumbnail image corresponding to a different playback angle at a playback time point identical to the playback time point of the first thumbnail image in response to a second touch input applied to the first thumbnail image.

4. The mobile terminal of claim 1, wherein the controller further controls the touchscreen to display a second frame corresponding to a third playback angle different from the first playback angle, at the first playback time point in response to an input applied to the first frame.

5. The mobile terminal of claim 1, wherein the controller controls the touchscreen to simultaneously display the first frame and a second frame corresponding to a third playback angle different from the first playback angle at the first playback time point in response to a touch input applied to the first frame.

6. The mobile terminal of claim 5, wherein the controller further controls the touchscreen to display a third frame corresponding to a playback angle different from the playback angle of the first frame together with the first frame and the second frame in response to a second touch input applied to the second frame.

7. The mobile terminal of claim 6, wherein the controller further controls the touchscreen to display the first frame with a reduced display size.

8. The mobile terminal of claim 1, wherein the controller further controls the touchscreen to display an angle indicator indicating the first playback angle of the first frame.

9. The mobile terminal of claim 8, wherein the controller further controls the touchscreen to display a second frame indicating a playback angle different from the playback angle of the first frame in response to a touch input applied to the angle indicator.

10. The mobile terminal of claim 1, wherein the controller further controls the touchscreen to display a second frame corresponding to a playback angle of 360 degrees and an editing indicator for editing a playback angle in response to a touch input applied to the first frame.

11. The mobile terminal of claim 1, wherein the controller is further configured to:
- display a playback icon together with the progress bar, and
- in response to a touch input applied to the playback icon while the first frame is displayed, sequentially display each frame corresponding to each playback angle of a 360 degree multi-view video and play a first video corresponding to the first frame after sequentially displaying each frame,
- wherein each of the displayed frames corresponds to the first playback time point,
- wherein each of the displayed frames corresponds to a predetermined tilt angle, and
- wherein each playback angle corresponding to each frame makes up a portion of the 360 degree multi-view video.

12. The mobile terminal of claim 11, wherein in response to a corresponding touch input applied to one of the frames while the frames are being sequentially displayed, the controller controls the touchscreen to play a second video corresponding to the frame to which the corresponding touch input is applied after the frame are being sequentially displayed.

13. The mobile terminal of claim 1, wherein the controller further controls the touchscreen to display a third thumbnail image corresponding to a second frame in which an object of a multi-view video appears at a third playback time point, in response to a touch input applied to the object which is displayed in the first frame.

14. The mobile terminal of claim 1, wherein if a movement of an object is recognized at a playback angle other than the first playback angle while the first video corresponding to the first frame is playing, the controller further controls the touchscreen to display a movement indicator.

15. The mobile terminal of claim 1, wherein if a movement of an object is recognized at a playback angle other than the first playback angle while the first video corresponding to the first frame is playing, the controller further controls the touchscreen to display a movement thumbnail containing the object and play a second video indicating a playback angle corresponding to the movement thumbnail in response to a touch input applied to the movement thumbnail.

16. The mobile terminal of claim 1, wherein when a movement of an object is recognized at a playback angle other than the first playback angle while the video is playing, the controller further controls the touchscreen to display a movement thumbnail containing the object and wherein if a touch input applied to the movement thumbnail is sensed, the controller stops the playing of the video and controls the touchscreen to sequentially scroll through and display each frame corresponding to each of 360 different angles of the multi-view video,
- wherein each of the displayed frames corresponds to a playback time point at which the touch input is applied to the movement thumbnail, and
- wherein each of the displayed frames corresponds to a predetermined tilt angle, and wherein each playback angle corresponding to each frame makes up a portion of the 360 degree multi-view video.

17. The mobile terminal of claim 1, wherein the multi-view video corresponds to a video in which 360 degrees are captured by a plurality of cameras at a predetermined tilt angle.

18. A method of controlling a mobile terminal, the method comprising the steps of:
- displaying a first frame corresponding to a first playback angle at a first playback time point of a multi-view video and a progress bar corresponding to the multi-view video;
- in response to a touch input applied to the progress bar, moving a time indicator displayed at a first position corresponding to the first playback time point to a second position corresponding to a second playback time point of the progress bar;
- displaying a first thumbnail image corresponding to the first playback angle at the second playback time point while maintaining displaying the first frame, as the time indicator is moved from the first position to the second position;
- in response to a touch input applied to the first thumbnail, changing the first thumbnail image into a second thumbnail image to indicate that the first playback angle is increased to a second playback angle at the second playback time point; and
- in response to a touch input applied to the second thumbnail image, replace the first frame with a different frame of the multi-view video and display the replaced first frame, the different frame corresponding to the second playback angle indicated by the second thumbnail image at the second playback time.

* * * * *